(12) United States Patent
Nickerson et al.

(10) Patent No.: US 8,041,805 B2
(45) Date of Patent: Oct. 18, 2011

(54) SYSTEM AND METHOD FOR REPORTING TO A WEBSITE OWNER USER REACTIONS TO PARTICULAR WEB PAGES OF A WEBSITE

(75) Inventors: Rand B. Nickerson, Highland Park, IL (US); Mark A. Treschl, Highland Park, IL (US); Kathryn L. Kidd, Montgomery Village, MD (US); Matthew J. Crofoot, Chicago, IL (US); A. Gregory Samata, West Dundee, IL (US); David E. Mason, West Dundee, IL (US)

(73) Assignee: OpinionLab, Inc., Highland Park, IL (US)

( * ) Notice: Subject to any disclaimer, the term of this patent is extended or adjusted under 35 U.S.C. 154(b) by 1291 days.

(21) Appl. No.: 11/458,625

(22) Filed: Jul. 19, 2006

(65) Prior Publication Data
US 2006/0248188 A1    Nov. 2, 2006

Related U.S. Application Data

(63) Continuation of application No. 09/595,050, filed on Jun. 14, 2000, now Pat. No. 7,085,820, which is a continuation-in-part of application No. 09/385,256, filed on Aug. 30, 1999, now Pat. No. 6,421,724.

(51) Int. Cl.
*G06F 15/173* (2006.01)
(52) U.S. Cl. ........... 709/224; 709/217; 709/229; 705/10
(58) Field of Classification Search .................. 709/200, 709/217, 224, 229; 705/10
See application file for complete search history.

(56) References Cited

U.S. PATENT DOCUMENTS
5,537,618 A    7/1996    Boulton et al. ............... 395/161
(Continued)

FOREIGN PATENT DOCUMENTS
WO    WO 00/62204    10/2000
(Continued)

OTHER PUBLICATIONS

BizRate.com, Independent Merchant Evaluation, https://eval.bizrate.com/popchoice.pl?id=19383&rb=1&ip=204.194.97.2&xsum=6774, 1 page https://eval.bizrate.com/eval_t.pl?id-19383&ip=204.194.97.2&xsum=67748&g=102, 5 pages, printed Jun. 13, 2000.

(Continued)

*Primary Examiner* — Kyung H Shin
(74) *Attorney, Agent, or Firm* — Baker Botts L.L.P.

(57) ABSTRACT

In certain embodiments, a system is provided for measuring page-specific user feedback concerning each of a plurality of particular web pages. A user-selectable element is viewable on and solicits page-specific user feedback concerning each such web page upon initial display of the web page, the element appearing identically and behaving consistently on each such web page. Software associated with the element is operable to receive the feedback concerning the web page for reporting, the feedback comprising one or more page-specific subjective ratings of the web page and one or more associated page-specific open-ended comments concerning the web page, the feedback allowing an interested party to access page-specific subjective ratings and associated page-specific open-ended comments across the plurality of web pages to identify one or more web pages for which the feedback is notable.

33 Claims, 10 Drawing Sheets

U.S. PATENT DOCUMENTS

| | | | |
|---|---|---|---|
| 5,678,041 A | 10/1997 | Baker et al. | 395/609 |
| 5,706,507 A | 1/1998 | Schloss | 395/615 |
| 5,727,950 A | 3/1998 | Cook | 434/350 |
| 5,754,939 A | 5/1998 | Herz et al. | 455/4.2 |
| 5,761,683 A | 6/1998 | Logan et al. | 707/513 |
| 5,778,182 A | 7/1998 | Cathey et al. | 395/200.49 |
| 5,804,803 A | 9/1998 | Cragun et al. | 235/375 |
| 5,809,247 A | 9/1998 | Richardson et al. | 395/200.48 |
| 5,862,223 A | 1/1999 | Walker et al. | 380/25 |
| 5,862,260 A | 1/1999 | Rhoads | 382/232 |
| 5,862,325 A | 1/1999 | Reed et al. | 395/200.31 |
| 5,870,744 A | 2/1999 | Sprague | 707/9 |
| 5,892,909 A | 4/1999 | Grasso et al. | 395/200.31 |
| 5,958,008 A | 9/1999 | Pogrebisky et al. | 709/223 |
| 5,991,735 A | 11/1999 | Gerace | 705/10 |
| 6,029,171 A | 2/2000 | Smiga et al. | 77/102 |
| 6,035,330 A | 3/2000 | Astiz et al. | 709/208 |
| 6,115,549 A | 9/2000 | Janis et al. | 395/712 |
| 6,134,531 A | 10/2000 | Trewitt et al. | 705/10 |
| 6,141,010 A | 10/2000 | Hoyle | 345/356 |
| 6,161,112 A | 12/2000 | Cragun et al. | 707/501 |
| 6,188,401 B1 | 2/2001 | Peyer | 345/335 |
| 6,189,029 B1 * | 2/2001 | Fuerst | 709/217 |
| 6,236,975 B1 | 5/2001 | Boe et al. | 705/7 |
| 6,260,064 B1 | 7/2001 | Kurzrok | 709/224 |
| 6,389,538 B1 | 5/2002 | Gruse et al. | 713/194 |
| 6,421,724 B1 | 7/2002 | Nickerson et al. | 709/224 |
| 6,434,556 B1 | 8/2002 | Levin et al. | 707/5 |
| 6,438,592 B1 | 8/2002 | Killian | 709/224 |
| 6,448,985 B1 | 9/2002 | McNally | 345/784 |
| 6,449,632 B1 | 9/2002 | David et al. | 709/202 |
| 6,477,504 B1 | 11/2002 | Hamlin et al. | 705/10 |
| 6,480,852 B1 | 11/2002 | Himmel et al. | 707/10 |
| 6,510,427 B1 | 1/2003 | Bossemeyer, Jr. et al. | 707/6 |
| 6,578,014 B1 | 6/2003 | Murcko, Jr. | 705/26 |
| 6,606,581 B1 | 8/2003 | Nickerson et al. | 702/186 |
| 6,606,659 B1 | 8/2003 | Hegli et al. | 709/225 |
| 6,631,184 B1 | 10/2003 | Weiner | 379/92.01 |
| 6,681,247 B1 | 1/2004 | Payton | 709/217 |
| 6,741,967 B1 * | 5/2004 | Wu et al. | 705/10 |
| 6,859,784 B1 | 2/2005 | van Duyne et al. | 705/10 |
| 6,895,437 B1 | 5/2005 | Cowdrey et al. | 709/224 |
| 2002/0049713 A1 | 4/2002 | Khemlani et al. | 707/1 |
| 2002/0065802 A1 | 5/2002 | Uchiyama | 707/1 |
| 2002/0072955 A1 | 6/2002 | Brock | 705/10 |
| 2002/0087969 A1 | 7/2002 | Brunheroto et al. | 725/13 |
| 2002/0111865 A1 | 8/2002 | Middleton | 705/14 |
| 2003/0207238 A1 | 11/2003 | Latzina et al. | 434/118 |

FOREIGN PATENT DOCUMENTS

| | | |
|---|---|---|
| WO | WO 2004/012044 | 2/2004 |

OTHER PUBLICATIONS

Unknown, "Different Versions of the OnlineOpinion Data Collection Technique Dramatically Impact the Type of Response a Website Receives," OpinionLab, Inc., White Paper, 5 pages, © 2001.

Nickerson, et al., "Measuring a Page-Specific Subjective User Reaction Concerning Each of Multiple Web Pages of a Website," U.S. Appl. No. 10/136,919, pending, May 1, 2002.

C Shahabi, et al., "Knowledge Discovery from Users Web-Page Navigation," XP010219671, ISBN: 0-8186-7849-6, Research Issues in Data Engineering, 1997 Proceedings, Seventh International Workshop on Birmingham, UK Apr. 7-8, 1997, Los Alamitos, CA, USA, IEEE Computer Society US, pp. 20-29, Apr. 7, 1997.

J.H. Watt, et al., "Using the Internet for Audience and Customer Research," XP010355892, ISBN: 0-7803-579-09-4, Professional Communication Conference 1999, IPCC 99, Communication Jazz: Improvising the New International Communication Culture, Proceedings 1999, IEEE International New Orleans, LA, USA Sep. 7-10, 1999, Piscataway, NJ, USA, IEEE US, pp. 121-130, Sep. 7, 1999.

PCT, Notification of Transmittal of the International Search Report or the Declaration, 7 pages, Jan. 8, 2004.

Notification of Transmittal of the International Search Report or the Declaration (PCT Rule 44.1) mailed Sep. 7, 2004 (12 pages) re International Application No. PCT/US 03/23327, Jul. 25, 2003.

Morgan, Bryan, "Visual J++ Unleashed," Online?, Sams.Net, Indianapolis,. IND., XP022333000, Chapter 25 Browser Support for Active Content, Jun. 21, 2005.

Faison, Ted, "Component-Based Development with VisualC#," Online!, XP002333001, Chapter 8, Creating Front Ends with the Web Browser Component, pp. 1-4, 27, 33, Feb. 2002.

Etgen, Michael et al., "What Does Getting WET (Web Event-Logging Tool) Mean for Web Usability?," Proceedings of the 5th Conference on Human Factors & The Web, XP002332999, Jun. 3, 1999.

PCT, Notification of Transmittal of International Preliminary Examination Report, 5 pages, Aug. 22, 2002.

Nickerson et al., "System and Method for Reporting to a Website Owner User Reactions to Particular Web Pages of a Website," U.S. Appl. No. 09/595,050, 57 pages, filed Jun. 14, 2000.

* cited by examiner

FIG. 6

1 COMMENTS

PLEASE ENTER YOUR COMMENTS ABOUT THIS PAGE.

CONTACT US ABOUT CUSTOMER SERVICE RELATED MATTERS

2 DETAILED PAGE RATINGS

| CONTENT | DESIGN | USABILITY |
|---------|--------|-----------|
| ○ ++ | ○ ++ | ○ |
| ○ + | ○ + | ○ |
| ○ +− | ○ +− | ○ |
| ○ − | ○ − | ○ |
| ○ −− | ○ −− | ○ |

3 OVERALL PAGE RATING

YOU MUST CLICK AN OVERALL PAGE RATING TO SUBMIT COMMENTS. THANK YOU.

⊕ (++)
⊕ (+)
⊕ (+−)
⊖ (−)
⊖ (−−)

PLEASE COMPLETE OUR USER REGISTRATION

FIG. 7

User Registration

By registering, you will be able to provide more useful feedback about websites you visit. Once you complete the following information, a cookie will store an ID with your browser that will identify your demographics with the ratings you make on a particular page.

You only need to complete the following information once and it will be associated with your ratings. You will use your password to update this information online.

Name: _____
Password: _____
E-mail Address: _____
Gender: [select gender ▼]
Age: [select age ▼]
Industry: [select industry ▼]
Employment Status: [select status ▼]

[Register]

Internet

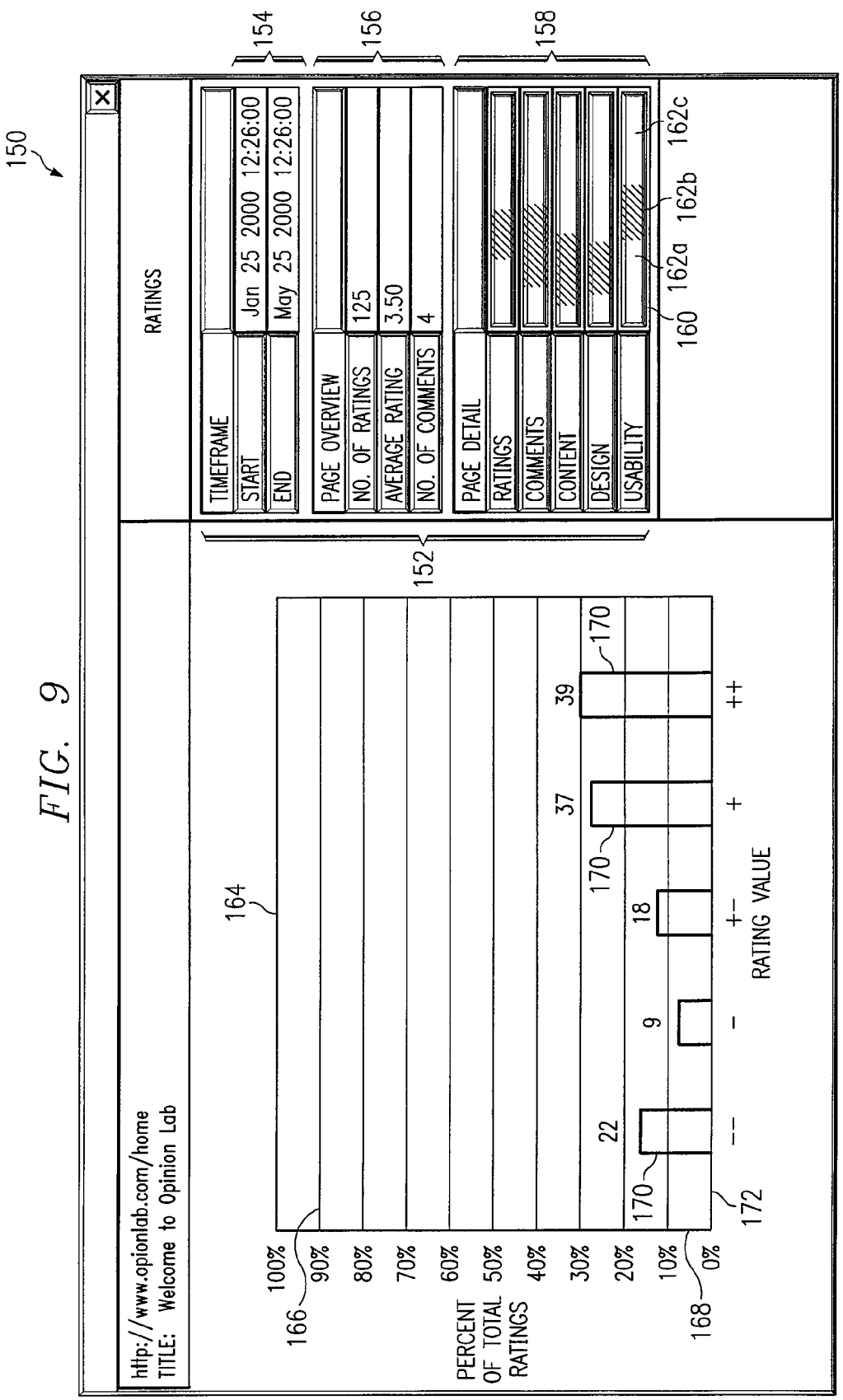

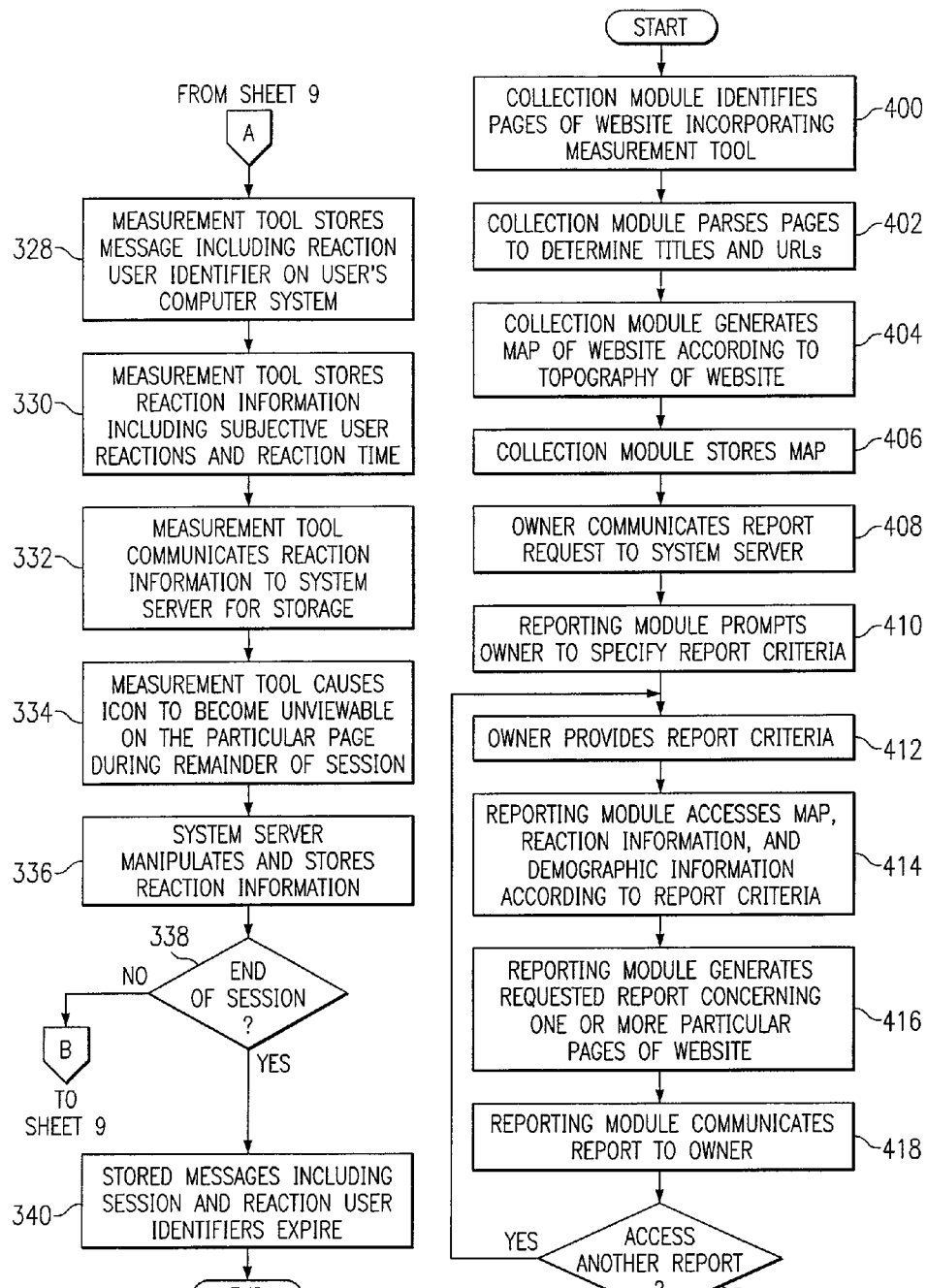

SYSTEM AND METHOD FOR REPORTING TO A WEBSITE OWNER USER REACTIONS TO PARTICULAR WEB PAGES OF A WEBSITE

RELATED APPLICATIONS

This application is a continuation of U.S. application Ser. No. 09/595,050, filed Jun. 14, 2000, now U.S. Pat. No. 7,085,820, which is a continuation-in-part of U.S. application Ser. No. 09/385,256, filed Aug. 30, 1999, now U.S. Pat. No. 6,421,724 B1.

TECHNICAL FIELD

This invention relates in general to communications and more particularly to a system and method for reporting to a website owner user reactions to particular web pages of a website.

BACKGROUND

Many website owners desire information concerning usage of their websites. For example, an Internet website owner might use a third party service to track the number of users that visit its website, the number of "clicks" these users collectively perform (using their mouse pointers) while visiting the website, and how long these users stay at the website. Using this objective information, the website owner may determine that its website is not attracting a sufficient number of users or has been ineffective at keeping the interest of users once they arrive. The website owner may react accordingly to improve its websites and, possibly, the success of its associated business operations.

Previous techniques for obtaining information concerning usage of websites often do not provide website owners with information about how users subjectively react to their websites, making the information of minimal value. Prior techniques that do solicit subjective user reactions do so with respect to transactions carried out using the website, but not with respect to the website itself. These techniques give website owners little if any information concerning subjective reactions of users to particular pages of their websites. Moreover, website owners are given little if any information about how users experience their websites as the users navigate through them, moving from page to page according to the topography of the websites. Even techniques that request users to provide subjective reactions concerning transactions may be relatively difficult to use, obtrusive, unstandardized, or otherwise deficient in some manner that causes them to be seldom used and therefore ineffective. The information reported to website owners may also be ineffective due to the format in which it is provided, for example, in reports that are difficult to interpret and do not allow useful comparisons to be made. These and other disadvantages make prior techniques inadequate for many website owners.

SUMMARY OF THE INVENTION

According to certain embodiments of the present invention, problems and disadvantages associated with previous techniques for receiving user feedback concerning websites may be substantially reduced or eliminated.

In certain embodiments, a system is provided for measuring page-specific user feedback concerning each of a plurality of particular web pages of a website. A user-selectable element is viewable on each of the plurality of particular web pages upon initial display of the particular web page and solicits page-specific user feedback concerning the particular web page upon initial display of the particular web page, the user-selectable element appearing identically and behaving consistently on each of the plurality of particular web pages. Software associated with the user-selectable element is operable to receive the page-specific user feedback concerning the particular web page for reporting to an interested party, the page-specific user feedback comprising one or more page-specific subjective ratings of the particular web page and one or more associated page-specific open-ended comments concerning the particular web page, the page-specific user feedback allowing the interested party to access page-specific subjective ratings and associated page-specific open-ended comments across the plurality of particular web pages to identify one or more particular web pages for which the page-specific user feedback is notable relative to page-specific user feedback for other particular web pages.

In certain embodiments, a system is provided for measuring page-specific user feedback concerning each of a plurality of particular web pages of a website. A first element is viewable on each of the plurality of particular web pages upon initial display of the particular web page and solicits page-specific user feedback concerning the particular web page upon initial display of the particular web page, the first element appearing identically and behaving consistently on each of the plurality of particular web pages. A second element is displayed in response to user selection of the first element and solicits one or more page-specific subjective ratings of the particular web page and one or more associated page-specific open-ended comments concerning the particular web page, the second element appearing identically and behaving consistently each time it is displayed in response to user selection of the first element viewable on a particular web page. Software associated with the first element is operable to receive the user selection of the first element and initiate display of the second element in response. Software associated with the second element is operable to receive the page-specific user feedback comprising one or more page-specific subjective ratings of the particular web page and one or more associated page-specific open-ended comments concerning the particular web page for reporting to an interested party, the page-specific user feedback allowing the interested party to access page-specific subjective ratings and associated page-specific open-ended comments across the plurality of particular web pages to identify one or more particular web pages for which the page-specific user feedback is notable relative to page-specific user feedback for other particular web pages.

Certain embodiments of the present invention may provide a number of important technical advantages over prior techniques. Certain embodiments of the present invention measure subjective user reactions to particular pages of websites using measurement software that is readily identifiable (according to the associated icon), easy to use, and unobtrusive. For example, in these embodiments, the user need not separately download any software and open a new window on the user's browser. As a result, not only may very valuable information be readily compiled—subjective reactions to particular pages, along with other appropriate data that may be correlated to the subjective reactions—but it is likely that many users will actually provide this information so that it may actually be compiled. This stands in sharp contrast to previous techniques. In addition, the website owner may relatively easily incorporate the measurement software into one or more new or existing pages of the website, rather than assuming the cost and delay often associated with rewriting software code of these pages. These and other advantages may contribute to this measurement software (and associated icon) becoming a standard across the entire community of Internet users.

The reports provided to the website owner, in addition to containing a wealth of previously unavailable information concerning the particular pages of the website, may be readily interpreted and allow useful comparisons to be made between these particular pages. Moreover, certain embodiments of the present invention may allow a website owner to access reports concerning the subjective user reactions in much the same way a user might navigate from one page to another within a website, according to the topography of the website. This may give the website owner additional valuable information upon which to base decisions concerning website. These and other advantages make the system and method of the present invention well suited for used in modern Internet and other environments in which users access websites.

One or more other technical advantages may be apparent to those skilled in the art from the figures, descriptions, and claims included herein.

BRIEF DESCRIPTION OF THE DRAWINGS

FIG. 6 illustrates an example combined general reaction measurement tool and specific reaction measurement tool;

FIG. 7 illustrates an example web page for registering a user;

FIG. 9 illustrates an example page level report;

FIG. 12 illustrates an example method of reporting on user reactions to particular web pages of a website.

DETAILED DESCRIPTION

Figure 1:
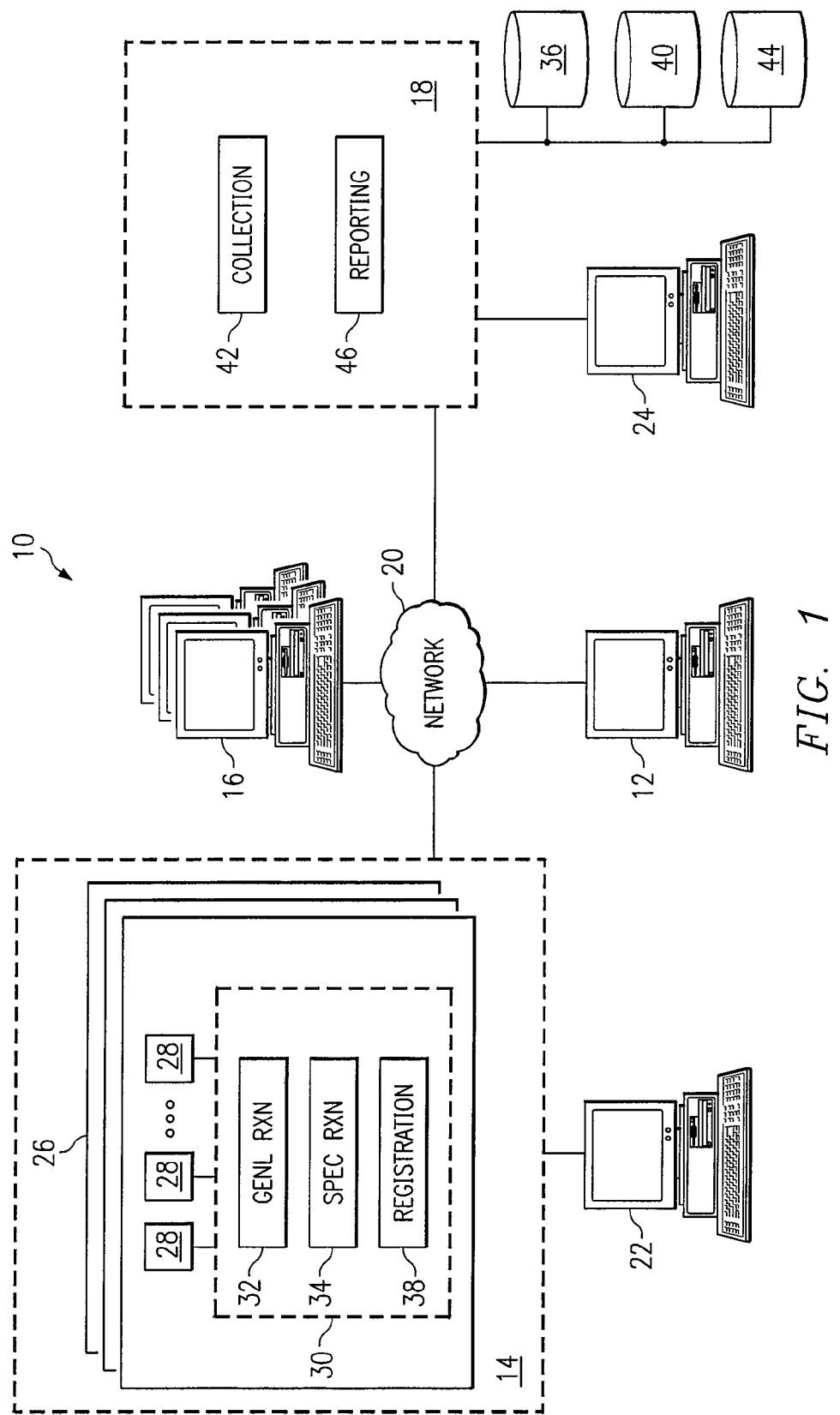
FIG. 1 illustrates an example system for measuring and reporting user reactions to particular web pages of a website.

FIG. 1 illustrates an exemplary system 10 for measuring and reporting on user reactions to particular web pages associated with a website using one or more reaction measurement tools that are incorporated in and viewable on the pages. As described more fully below, in one embodiment, the reaction measurement tools are standardized across some or all of the web pages, are readily identifiable by users of the pages, and are intuitive, predictable, and easy for the users to use in providing their reactions to the pages. As a result, these measurement tools provide a number of important technical advantages over previous techniques for measuring user input, which may merely measure and report objective website usage information or user reactions concerning transactions rather subjective user reactions on a page by page basis. Such systems are therefore incapable of providing meaningful feedback to website owners as to the "topography" of their websites; that is, which of possibly numerous pages of a website have been rated particularly successful or unsuccessful in the eyes of users of the website as those users navigate through the pages of the website according their particular needs. Embodiments of the system and method of the present invention address these and other deficiencies.

Although embodiments of the present invention are described primarily in connection with the measurement and reporting of subjective user reactions to one or more particular pages of one or more websites, the present invention may be similarly applied in connection with polling, surveying, product development research, market research, usability testing, business-to-consumer (B2C) commercial transactions, business-to-business (B2B) commercial transactions, or any other suitable activity for which the measurement and reporting of user responses may be desirable. Those skilled in the art will readily appreciate the application of the present invention to such activities based on these figures, descriptions, and claims.

System 10 includes a website owner 12, a web server 14, one or more website users 16, and a reporting server 18 coupled to one another using network 20, which may be any suitable local area network (LAN), metropolitan area network (MAN), wide area network (WAN), a global communications network such as the Internet, or any other suitable network. Although owner 12, server 14, users 16, and server 18 are described as coupled using a single network 20, the present invention contemplates multiple networks 20 of the same type or different types to couple these components to one another, according to particular needs. Owner 12 and users 16 may each be autonomous computer systems or may receive appropriate input from one or more associated persons. Servers 14 and 18 may include software operating on one or more computer systems 22 and 24, respectively, at one or more locations. Owner 12, server 14, and server 18 may operate on at least one shared computer system. The computer systems associated with owner 12, user 16, server 14, and server 18 include input devices, output devices, processors, memories, and other components suitable for the features and operation described below.

Web server 14 hosts or otherwise supports at least one website 26 including one or more pages 28. Although pages 28 are described primarily as web pages 28 associated with a typical website 26, the present invention contemplates measuring and reporting user reactions to files, documents, or any other formatted information. Moreover, although a single website 26 for a single owner 12 is described in detail, server 14 may support one or more websites 26 for each of multiple owners 12. In general, using an associated web browser or other software component, the user 16 provides a uniform resource locator (URL) or other electronic address to establish a connection to server 14 and access a particular page 28 associated with website 26. Server 14 communicates the requested page 28 to user 16 using network 20, user 16 receives page 28, and the user 16 views or otherwise processes page 28 according to the user's particular needs. User 16 will typically provide one or more additional URLs during a single browser session to access additional pages 28 associated with website 26, navigating through the topography of website 26 according to particular needs. Multiple users 16 may access a single page 28 substantially simultaneously. The present invention contemplates one or more website users 16 accessing one or more pages 28 of website 26 in any suitable manner during one or more browser sessions.

Each user 16 may have an opinion, assessment, feeling, or other subjective reaction to each page 28 communicated to the user 16, either in its entirety or more specifically to the format, content, design, or another characteristic associated with page 28. For example only and not by way of limitation, user 16 may consider a particular page 28 helpful, informative, understandable, humorous, or may otherwise have a positive or favorable reaction to page 28, generally or with respect to one or more specific aspects of page 28. Alternatively, for example and without limitation, user 16 may consider a particular page unhelpful, uninformative, confusing, boring, or may otherwise have a negative or unfavorable reaction to page 28, generally or with respect to one or more specific aspects of page 28. The strength of this subjective reaction, whether positive or negative, may vary from mild to very strong. Rather than having a positive or negative reaction, user 16 may have a neutral reaction to page 28. Moreover, the subjective reaction of user 16 to page 28, generally or as to specific aspects, may be different from the subjective reaction of user 16 to other pages 28 or to website 26 in its entirety. Where appropriate, the phrase "reaction to page 28" is meant to include responses to one or more explicit questions concerning page 28, concerning one or more visual, audible, or other elements of page 28, or concerning one or more items with which page 28 is logically associated. Even more broadly, where appropriate, the phrase "reaction to page 28" may include responses to any explicit question, whether or not the subject of the question is related in some manner to page 28.

According to embodiments of the present invention, the reactions of users 16 to one or more particular pages 28 of website 26 are measured and compiled to allow system 10 to provide valuable information to owner 12 concerning the topography of website 26; that is, particular pages 28 and specific aspects of those particular pages 28 that have been successful or unsuccessful in the eyes of users 16 as users 16 navigate through pages 28 of the website 26. In one embodiment, server 14 supports a user reaction measurement tool 30 that is incorporated into pages 28 and may be communicated to user 16 with page 28 in response to user 16 requesting page 28.

As described below with reference to FIGS. 2 through 6, the tool 30 is preferably incorporated in page 28, both as a viewable icon and as suitable software components, in a manner that does not conflict with the existing design or coding of page 28. In a particular embodiment, tool 30 includes software code incorporated into the Hypertext Markup Language (HTML), Extensible Markup Language (XML), or other software code of page 28. Tool 30 also includes one or more JAVASCRIPTS, or other suitable scripts, that may be stored in a dedicated or other suitable directory. In the particular embodiment, the software code incorporated into page 28 calls the script response to the user 16 selecting an icon associated with tool 30 to provide a subjective user reaction. Tool 30 may be incorporated in one or more pages 28 of website 26, directly or indirectly such as through a call to a script within a dedicated directory, in any appropriate manner without departing from the intended scope of the present invention. In response to user 16 accessing the associated page 28, the incorporated software code and the directory containing the script are communicated with page 28 to user 16. Unless otherwise specified or appropriate, a reference to tool 30 is meant to include reference to the viewable icon, the script and its directory, the call to the script incorporated in the code of page 28, and any other components of tool 30, singly or in any combination. In one embodiment, the tool 30 continues to execute on the computer system of user 16, with associated page 28, until user 16 provides a user reaction or closes the user's web browser.

As described more fully below with reference to FIGS. 2 through 6, tool 30 may include a general reaction measurement tool 32 for measuring the user's general reaction to the associated page 28, for example only and not by way of limitation, according to a multi-level or another suitable subjective rating scale. Also as described more fully below with reference to FIGS. 2 through 6, instead of or in addition to general reaction measurement tool 32, tool 30 may include a specific reaction measurement tool 34 for measuring the user's reaction with respect to one or more selected aspects of page 28, according to the same or a different subjective rating scale as for tool 32. For example and without limitation, tool 34 may measure the subjective reaction of user 16 to the content, design, usability, or any other suitable aspect of page 28, singly or in any combination. Reactions measured using tool 30, 32, or 34 may include responses to one or more explicit questions posed to user 16 concerning page 28, concerning one or more visual, audible, or other elements of page 28, concerning one or more items with which page 28 is logically associated, or concerning any other suitable subject. As described more fully below, tools 30, 32, and 34 may allow a user 16 to provide comments or access additional information concerning the rating scale, tool 30, 32, or 34, website 26, owner 12, or any other appropriate aspect of system 10. Subjective reactions and related input received from users 16 may be stored temporarily on the computer system of user 16, within tool 30, or at another suitable location before being communicated to server 18 for storage within database 36, which may include one or more data storage locations integral to or separate from computer system 24.

In one embodiment, user reaction measurement tool 30 includes registration module 38 for collecting appropriate demographic or any other suitable information associated with user 16. Using such demographic information, the reactions of user 16 to pages 28 may be categorized and analyzed to obtain further information that may be valuable to owner 12 or to others. Not only can demographic information be correlated to user reactions, but the linking between demographic information and user reactions may be used to determine additional information about the correlation between user reactions and other metrics. For example, system 10 or another system may collect website traffic data, along with demographic information requested from website visitors, such that the traffic data may be correlated with the demographic data. System 10 may collect user reaction data, along with demographic information requested from users 16, such that the user reaction data may be correlated with the demographic data. Since in this example both the website traffic data and the user reaction data are correlated with demographic information, the traffic data and user reaction data may be correlated with one another to provide owner 12 or others with potentially valuable information. It may also be desirable to present the traffic data and user reaction data together in an integrated fashion, with or without the linking demographic information, using a single "dashboard" or other suitable visual display. Any set of two or more metrics may be correlated in an analogous manner, using a common link to demographic or other suitable compiled information, and presented together using a single visual display.

As described more fully below with reference to FIG. 7, the registration module 38 may be implemented using a registration page or pop-up window that is presented to a user 16 at least the first time the user 16 selects tool 30 to provide a subjective user reaction to a page 28 associated with website 26. The demographic information received from users 16 is communicated to server 18 for storage in database 40, which may include one or more data storage locations integral to or separate from database 36 and computer system 24. This demographic information may be accessible to users 16, with appropriate password protection, to allow the users 16 to add to, delete, or modify some or all of their associated demographic information, as appropriate. Alternatively, users 16 might communicate appropriate modifications, using e-mail for example, to a person responsible for implementing such modifications. Although a particular registration procedure is described, user 16 may register in any appropriate manner, for example, by facsimile, regular mail, or telephone (possibly using an interactive voice response (IVR) system).

In general, website owner 12 is any entity responsible for at least one aspect associated with website 26, for example only, financing, creation, editing, approval, review, implementation, administration, or any other suitable aspect associated with website 26. Owner 12 interacts with servers 14 and 18 as appropriate to set up and administer one or more websites 26 hosted or otherwise supported on server 14, including incorporating tool 30 into pages 28 and accessing any reporting information on user reactions to pages 28. Before allowing owner 12 to incorporate tool 30 and the associated software components into pages 28, server 18 may require that owner 12 provide appropriate identification, billing, and other information; may notify owner 12 that website 26 may be "crawled" to identify and gather data pertaining to pages 28; may provide owner 12 with a license agreement or other information concerning services being provided to owner 12; and may communicate any other appropriate information with owner 12. Server 18 may store some or all of the registration and setup information described above in one or more appropriate storage locations (not explicitly shown) according to particular needs. Server 18 may also assign owner 12 an identifier and password for use in accessing reports concerning one or more particular pages 28 of website 26, as described more fully below. Although server 18 is described as handling the registration of owner 12, owner 12 may register in any appropriate manner, such as by facsimile, by regular mail, or by telephone (possibly using an interactive voice response (IVR) system).

After appropriate information has been communicated between owner 12 and server 18 and, if desirable, verified in some appropriate manner, owner 12 may use a wizard or other software component to download or otherwise communicate one or more pages 28 (or preferably copies of pages 28) of the website 26 from server 14 to the computer system of owner 12. Pages 28 may be communicated to owner 12 using File Transfer Protocol (FTP) or in any other suitable manner, singly or as a group. Owner 12 may specify, for each page 28, the type of viewable icon the owner 12 wants to appear on page 28, the color of the icon, or any other suitable characteristic of the icon. In one embodiment, characteristics of the icon may include one or more explicit questions concerning page 28, concerning one or more visual, audible, or other elements of page 28, or concerning one or more items with which page 28 is logically associated. Where appropriate, the characteristics of the icon may include any explicit question, whether or not the subject of the question is related in some manner to page 28.

To specify an icon and its characteristics, as an example only and not by way of limitation, owner 12 might click on the desired icon, which might be one of multiple standard icons, and manipulate its characteristics using pull down menus. Owner 12 might then click on, drag and drop, or otherwise incorporate the desired icon into the local version of the page 28. The incorporation might instead occur automatically in response to owner 12 specifying characteristics of the icon. The wizard may create a dedicated or other suitable directory containing the script of tool 30 and, in addition, paste or otherwise incorporate a call to the script in the software code of the page 28. Owner 12 may use the wizard or another software component to upload or otherwise communicate each modified page 28 (incorporating the tool 30) back to the server 14, singly or as a group, to replace corresponding previous page 28 (not incorporating tool 30) within website 26. The process through which owner 12 may incorporate tool 30 in one or more pages 28 provides an important technical advantage of embodiments of the present invention. In one embodiment, incorporation of tool 30 in pages 28 frees users 16 from needing to download separate software (separate from accessing page 28) or open a separate window to provide subjective reactions using tool 30, providing another important technical advantage.

Alternatively, server 18 might communicate tool 30 directly to server 14 for automatic incorporation into pages 28. Less desirably, server 18 might communicate to owner 12 a file containing the software code to be incorporated into the code of pages 28 and also containing the directory with the script to be called when user 16 selects tool 30 to provide a user reaction. Owner 12 may download from server 14 or otherwise obtain a local version of each page 28, manually edit each of the pages 28 by pasting in the appropriate software components, and then upload or otherwise communicate modified pages 28 (incorporating tool 30) back to server 14, singly or as a group, to replace previous pages 28 (not incorporating tool 30) within website 26. As another alternative, the tool 30 might be incorporated into page 28 as page 28 is constructed, such as with an entirely new website 26 or when new content is added to an existing website 26.

Although a number of possible alternatives are described in detail, tool 30 may be incorporated into pages 28 of website 26 in any suitable manner without departing from the intended scope of the present invention. Moreover, although a web page 28 is primarily described, the present invention contemplates tool 30 being incorporated in or otherwise associated with an e-mail message, advertisement, Graphics Interface Format (GIF) file, or other suitable collection of information communicated to user 16, whether or not considered a web page 28. Any such collection of information incorporating tool 30 may be considered a page 28, where appropriate. For example, tool 30 may be incorporated into an attachment to an e-mail message communicated to user 16 and soliciting one or more subjective reactions to the content, delivery, or other aspect of the e-mail. Upon receiving the e-mail message, user 16 might open the attachment, click on or otherwise select the icon to provide one or more requested user reactions, and thereby cause user reaction information to be communicated to server 18 for collection and reporting.

As still another possible alternative within the scope of the present invention, tool 30 may be embedded or otherwise incorporated into the user's web browser rather than pages 28 to provide substantially equivalent functionality. In one embodiment, user 16 may download tool 30, either as part of accessing a page 28 or directly, and perform any appropriate subsequent operations to incorporate tool 30 into the web browser. Tool 30 may be installed each time user 16 accesses a page 28 or may be installed the first time user 16 accesses a page 18 and remain installed until user 16 desires to uninstall the tool 30. If the tool 30 is incorporated into the web browser rather than page 28, the viewable icon associated with tool 30 may appear in the "masthead" area of the browser window, may appear so as to obscure some or all of page 28 within the browser window, or may appear in any other suitable location and in any other suitable manner, according to particular needs.

Periodically or in response to receiving reaction information from a user 16 concerning one or more particular pages 28 of website 26, collection module 42 of server 18 may perform a "crawl" to identify the pages 28 that are associated with website 26 (and possibly other websites 26) and incorporate tool 30. Based on this information, the collection module 42 may generate a map or other suitable report concerning the topography of website 26 and store the map in a database 44, which may include one or more storage locations integral to or separate from database 36, database 40, and server 18. In one embodiment, the pages 28 are parsed to identify their titles, URLs, and other suitable information for use in generating the map. Reporting module 46 uses the map to generate reports concerning the pages 28 of website 26, which might be linked to one another according to the topography of website 26 as described more fully below with reference to FIG. 9. Owner 12 may subsequently modify one or more pages 28 of website 26 according to the subjective ratings or other user reactions received from users 16 (and possibly their demographic profiles), as reflected in the reports, to improve the pages 28 or better tailor the pages 28 for particular categories of users 16.

In some cases, owner 12 may be an organization and different persons within the organization might be responsible for different sets of one or more pages 28 of website 26. This may be an especially likely scenario when the owner 12 is a large company and website 26 includes a large number of pages 28. In one embodiment, when owner 12 is registering with server 18, owner 12 is requested to provide the e-mail address or other contact information for each such person, to identify pages 28 for which the person is responsible, and specify contact criteria. The information may be stored in a storage location (not explicitly shown) at or otherwise accessible to server 18. The contact criteria may apply to all the pages 28 for which the person is responsible or for one or more selected pages 28. For example, the contact criteria might specify that if a page 28 receives five negative ratings within a specified time period, the person associated with that page 28 will be automatically informed using the stored e-mail address. Moreover, if a user 16 provides comments using the icon associated with a page 28, the comments may be automatically communicated to the person associated with that page, as the comments are received or periodically as a group. The present invention contemplates any suitable threshold or other contact criteria, according to particular needs.

In the operation of system 10, owner 12 interacts with servers 14 and 18 as appropriate to register the owner 12 and download or otherwise incorporate tool 30 into one or more pages 28 of website 26. The user 16 accesses a particular page 28 incorporating tool 30 during a browser session and uses tool 30 to provide one or more general or specific reactions to page 28. In one embodiment, if user 16 has not previously accessed any page 28 incorporating tool 30 during the browser session, tool 30 may determine an Internet Protocol (IP) or other electronic address for the computer system associated with user 16 and, when technically feasible, determine a hostname for the computer system. This preferably allows each user reaction to be associated with a particular computer system coupled to network 20. Tool 30 may attempt to store a cookie, token, or other appropriate message including a browser session identifier on the user's computer system, using the user's web browser or in any other manner. Each time user 16 accesses another page 28 incorporating tool 30 during the browser session, tool 30 may access this stored message and respond accordingly.

In response to user 16 providing a general or specific subjective reaction to page 28, tool 30 may also attempt to store on the user's computer system a cookie, token, or other message that includes a reaction user identifier, which tool 30 may access as appropriate during the remainder of the browser session. The tool 30 may store the reaction user identifier on the user's computer system, possibly along with the time and date at which user 16 provided the reaction. After user 16 provides a subjective reaction to the page 28, tool 30 may cause a previously viewable icon associated with tool 30 to become unviewable on page 28 for the remainder of the browser session (if user 16 returns to the page 28), for as long as user 16 remains on page 28, for a specified time period, or otherwise. As a result, user 16 may be given no opportunity to provide multiple reactions to the same page 28, for example, during the same browser session or during the specified time period, which may make the reported results more meaningful.

For example, if tool 30 causes the icon to become unviewable on a first page for which user 16 provided a user reaction, user 16 accesses a second page 28, and user 16 later returns to first page 28 during the same browser session, then tool 30 may recognize this based on the stored message including the reaction user identifier and prevent the icon from appearing on first page 28 for this and any other subsequent accesses of first page 28 during the browser session. Alternatively, tool 30 might allow the associated icon to remain viewable and might receive subsequent reactions to first page 28, but might simply ignore such subsequent reactions. Of course, tool 30 may simply receive from user 16 and process all the user reactions to a particular page 28, whether or not multiple reactions are received from user 16 for the particular page 28 during the same browser session or during a specified time period. In one embodiment, the cookies, tokens, or other messages that tool 30 stores on the user's computer system, including at least the browser session identifier and reaction user identifier, may expire when user 16 closes the user's web browser.

In one embodiment, user 16 is asked to provide demographic information the first time the user 16 provides a reaction to a page 28 associated with a website 26 supported on server 14 and incorporating tool 30. If user 16 provides the requested demographic information, tool 30 and server 14 communicate the information to the server 18 for storage in database 40. Tool 30 may also assign a demographic user identifier and store it on the user's computer system in the form of a cookie, token, or other suitable message. In one embodiment, this allow reports to be generated that reflect the demographic information, correlating it to user reaction information, and give owner 12 further valuable information regarding pages 28 of website 26. The demographic user identifier is preferably the same as the reaction user identifier to allow the reaction information and demographic information to be readily associated with one another. As discussed above, demographic information linked to reaction information may be used correlate the reaction information with one or more other metrics that are similarly linked to demographic information.

If user 16 previously provided demographic information and accepted the associated cookie, token, or other message with the demographic user identifier, tool 30 determines this each time user 16 accesses another page 28 of website 26, during the same or a different browser session. Ideally, user 16 is requested to and does provide the demographic information the first time user 16 accesses a page 28 that incorporates tool 30. However, if user 16 elects not to provide some or all requested demographic information, tool 30 may again invite user 16 to provide demographic information in response to user 16 selecting tool 30 to provide a subsequent reaction to the same or a different page 28. Tool 30 might stop requesting the demographic information, at least for a specified period, after a specified number of refusals so as not to unduly alienate the user 16 or deter user 16 from providing reactions to pages 28 or from even accessing pages 28.

User identifiers for user 16 may also be used for a variety of other suitable purposes. For example, according to a user identifier stored as a cookie, token, or other message on the user's computer system, tool 30 may cause a particular question to be presented to user 16 in response to user 16 providing a user reaction. As a more particular example, every tenth time the user 16 selects tool 30 to provide a user reaction to an associated page 28, tool 30 might cause a question to appear inviting user 16 to indicate (in addition to providing the user reaction) whether user 16 is a customer of website 26 or its owner 12. User 16 might be given an opportunity to provide comments in addition to answering "Yes" or "No." Such questions could be presented in response to the user 16 actually providing a user reaction using tool 30, instead of merely selecting tool 30.

In response to user 16 providing a general or specific reaction to a page 28, tool 30 stores the reaction temporarily in memory on the computer system associated with user 16 before instructing the computer system to communicate the reaction to server 18. Tool 30 may also collect the time and date at which user 16 provided the reaction. Tool 30, using the user's computer system, may communicate user reaction information for page 28 to server 18 before or after user 16 leaves page 28. In one embodiment, the reaction information may include the title, URL, start time and date, reaction time and date, user reaction, and reaction user identifier, in any combination and without limitation. Reaction information may additionally include "web profile" information for the user 16, such as the IP address, hostname, username, password, network connection, operating system, web browser, screen resolution, plug-ins, or any other appropriate aspects of the user's environment. Tool 30 may compute the time user 16 spent on page 28 before providing a reaction or may leave this task for server 18 to perform.

Server 18 receives and accepts the reaction information. This may include determining the title, URL, user reaction, and reaction user identifier; computing the time user 16 spent on the page 28 before providing the reaction; and other appropriate operations. In one embodiment, server 18 attempts to match the received reaction user identifier with a stored demographic user identifier and, according to the match, associate the demographic information with the reaction information. The server 18 stores some or all of the reaction information, preferably in association with the demographic information, in database 36 for use in generating reports accessible to owner 12. Server 18 may communicate a message to user 16, through the user's web browser or otherwise, to inform user 16 that the reaction was successfully received. As multiple users 16 provide their subjective reactions to pages 28 as they navigate through website 26 according to its topography, a wealth of information concerning pages 28 may be assembled and later provided to owner 12 for use in improving particular pages 28 and thus website 26 as a whole. To access one or more reports reflecting this information, the owner 12 communicates report requests to server 18 and, in response, receives the requested reports.

Figure 2:
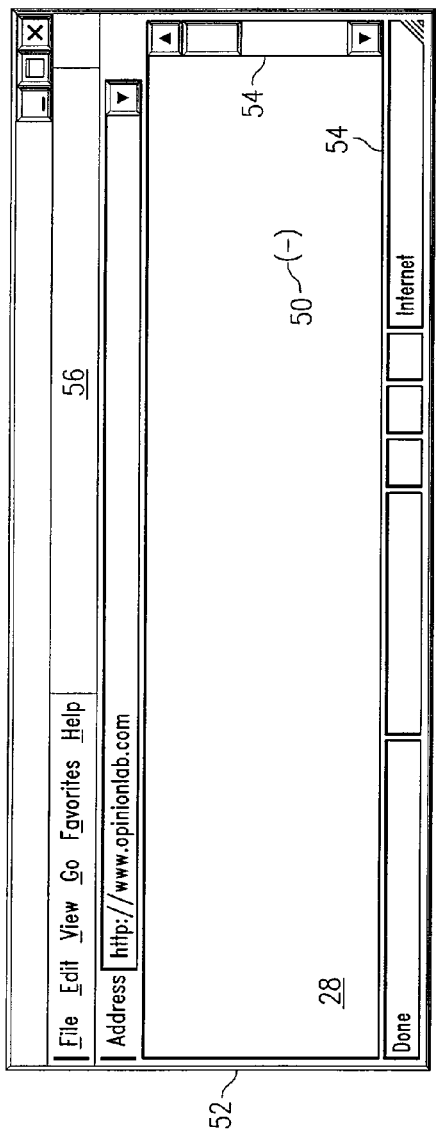
FIG. 2 illustrates an example web page incorporating a user reaction measurement tool.

FIG. 2 illustrates an exemplary web page 28 incorporating user reaction measurement tool 30. In one embodiment, as described above, tool 30 provides a mechanism for measuring subjective user reactions to page 28 that is standardized across some or preferably all pages 28 of website 26, is readily identifiable by users 16, and is intuitive, predictable, and thus easy for these users 16 to use in providing their subjective reactions to pages 28. In a more particular embodiment, the tool 30 appears to users 16 as a language-independent icon 50, viewable on page 28 within the user's browser window, that periodically or continuously spins, flips, switches, animates, or otherwise alternates between "(+)" and "(−)" symbols, "[+]" and "[−]" symbols, "+" and "−" symbols, or any other suitable variation of plus and minus symbols.

For example only and not by way of limitation, parentheses around the plus and minus symbols may meet (or nearly meet) above and below the plus and minus symbols to resemble a capital "O" or oval. Analogously, square brackets around the plus and minus symbols may meet (or nearly meet) above and below the plus and minus symbols to resemble a square. Furthermore, although variations of plus and minus symbols are primarily described, any suitable stationary or animated icon 50 may be used to represent the association of tool 30 with page 28, and the opportunity to provide a user reaction, without departing from the intended scope of the present invention. Preferably, icon 50 is the same or substantially the same across all pages 28 of website 26 and, more preferably, pages 28 of other websites 26. This may contribute to the icon 50 becoming a readily identifiable and well-accepted standard throughout the community of all users 16 of websites 26.

Typically, only a portion of page 28 will be viewable within browser window 52 at any one time as user 16 scrolls or otherwise navigates through page 28. In one embodiment, icon 50 appears at or near a specified location relative to the border 54 of browser window 52 in the viewable portion of page 28. Icon 50 may remain in substantially the same location relative to border 54 as user 16 scrolls or otherwise navigates through page 28. Alternatively, icon 50 might be located in the masthead region 56 of the browser window and remain in masthead region 56 as the user 16 scrolls or otherwise navigates through page 28. Causing the icon 50 to remain in substantially the same location within browser window 52 may help encourage user 16 to provide a subjective reaction to page 28 using tool 30, and make it easier for user 16 to do so. This feature may further contribute to icon 50 becoming readily identifiable and well-accepted throughout the user community.

Figure 3:
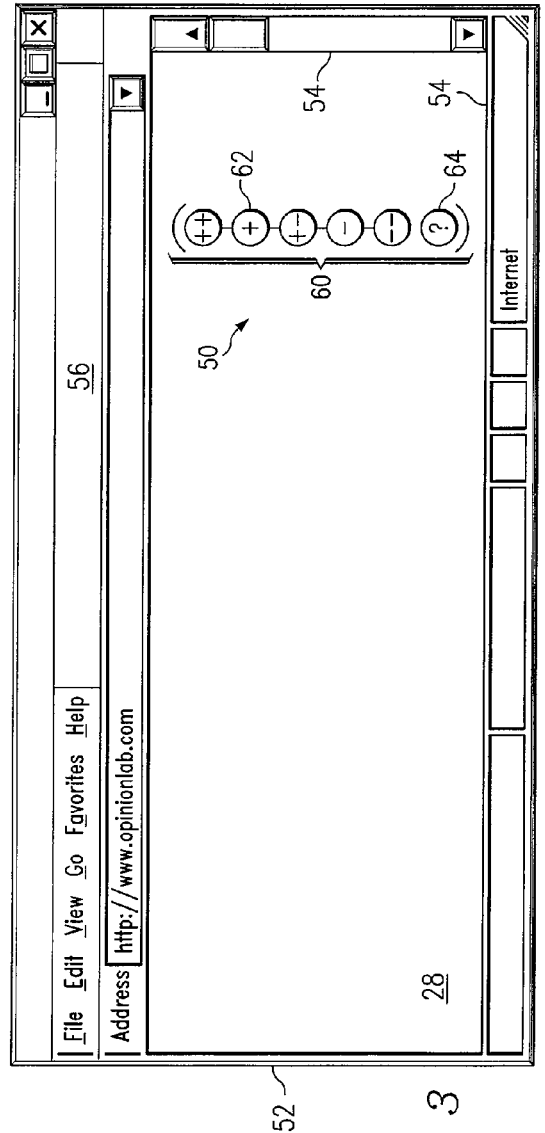
FIG. 3 illustrates an example web page incorporating a general reaction measurement tool.

As illustrated in FIG. 3, in response to the user 16 rolling an associated mouse pointer over icon 50, pointing to and clicking on icon 50 using the mouse pointer, touching icon 50 using an associated touch screen, or selecting icon 50 in another suitable manner, icon 50 may change into or be replaced with a multi-level subjective rating scale 60 that corresponds to general reaction measurement tool 32. In a particular embodiment, rating scale 60 includes five levels ranging from very negative to very positive, each level having an associated language-independent or other appropriate symbol 62. For example and without limitation, a "−−" symbol 62 might correspond to a very negative rating, a "−" symbol 62 might correspond to a somewhat negative rating, a "+−" symbol 62 might correspond to a neutral rating, a "+" symbol 62 may correspond to a somewhat positive rating, and a "++" symbol 62 may correspond to a very positive rating. Although a five level rating scale 60 is described above in connection with a particular embodiment, any appropriate multi-level or other subjective rating scale or scheme may be used without departing from the intended scope of the present invention.

To record a general reaction to page 28, the user 16 clicks on, points to, or otherwise selects an appropriate symbol 62 reflective of that reaction. In response, tool 32 (or tool 30) may store the user reaction information and, at the appropriate time, cause the reaction information to be communicated to server 18 for storage in database 36. In a particular embodiment, the user reaction information collected in response to user 16 providing a general reaction to the page 28 may include, in any suitable combination and without limitation: (1) the title of page 28; (2) the URL for page 28; (3) the reaction user identifier; (4) the subjective rating (for example only, "++," "+," "+−," "−," or "−−"); (5) the time and date page 28 was accessed; (6) the time and date the subjective rating was received; (7) the web profile information for user 16; and (8) any other suitable information. According to the demographic user identifier, if one is available at server 18, the demographic information for user 16 may be stored in association with the user reaction information in database 36, as described more fully above.

Where appropriate, reactions to page 28 collected using tools 30 and 32 may include responses to one or more explicit questions posed to the user 16 concerning page 28, concerning one or more visual, audible, or other elements of page 28, or concerning one or more items with which page 28 is logically associated. Questions may be presented instead of or in addition to rating scale 60. As an example, a page 28 of a vehicle manufacturer's website 26 may include a picture of a particular make and model of vehicle. Questions posed to user 16 using tool 30 or 32, in response to the user 16 selecting icon 50, might include "How well do you like this picture?" or "Do you like the shape of the tail fin?" for example. The responses to the questions might be received using rating scale 60, similar to collection of user reactions to page 28 described above, or might be received using a color or other suitable scale. For example, user 16 might select a green box, dot, or other visual element to provide a "Yes" response, might select a white box, dot, or other visual element to provide a "neutral" response, and might select a red box, dot, or other visual element to provide a "No" response. Each question may appear within a banner, bar, flag, or other visual element in response to user 16 selecting icon 50, in response to user 16 providing a reaction to page 28 using tool 30, 32, or 34, or otherwise. A particular color, shape, or other indicia associated with the element may always signify the same question, regardless of the page 28 on which it appears. For example only, a green element might always signify the question, "Do you consider the price of this item fair?" A particular question may be posed in response to the user 16 providing a particular subjective rating of the page 28 or a particular response to a previous question, the question presented being dependent upon the previous response. According to embodiments of the present invention, one or more questions may be associated with any one or more pages 28 of website 26 according to the particular needs of owner 12, providing an important technical advantage.

Some or all of the stored information concerning page 28 may be provided to owner 12 in the form of one or more suitable reports to allow owner 12 to assess the success of the particular page 28 in the eyes of the user community. As described more fully above with reference to FIG. 1, icon 50 may cease to be viewable in browser window 52 after a general reaction to page 28 has been received from user 16. Although in one embodiment only tool 32 (not tool 34) may be viewable on page 28 in response to selection of tool 30, the present invention contemplates tool 34 being visible on page 28 instead of or in addition to tool 32.

Figure 4:
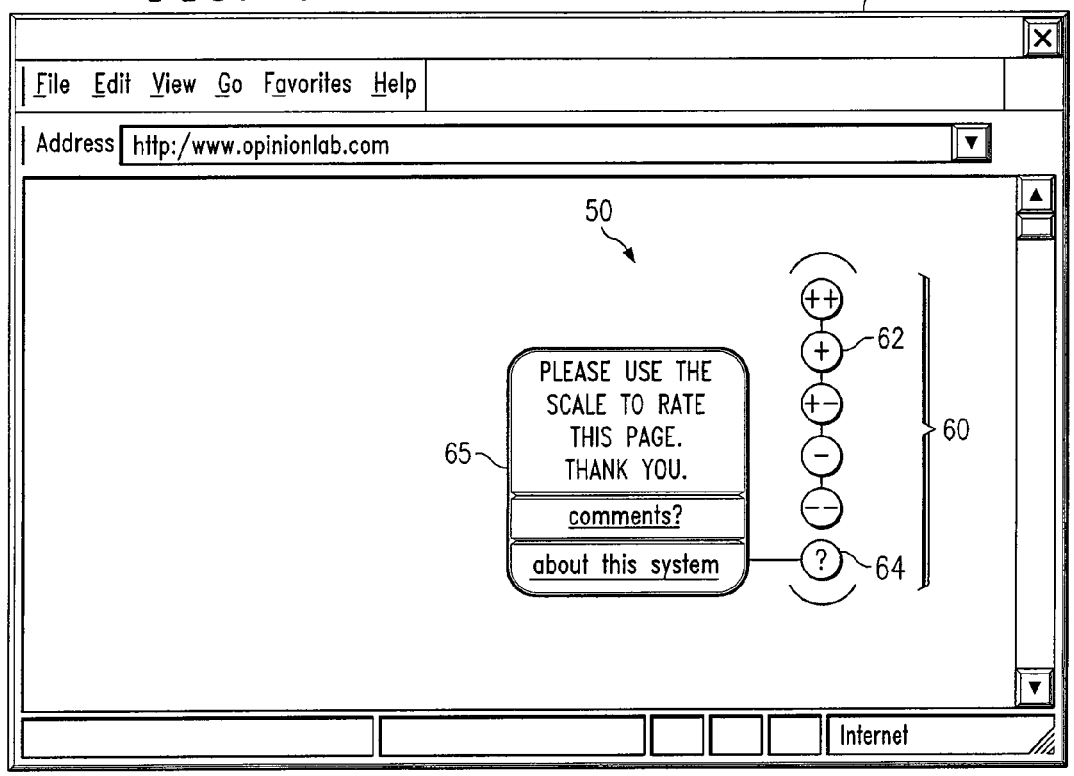
FIG. 4 illustrates another example general reaction measurement tool.

In one embodiment, a question mark or other symbol 64 may be associated with rating scale 60 to allow user 16 to provide comments relating to page 28, one or more specified aspects of page 28, one or more items associated with page 28, or any other appropriate comments. Symbol 64 might further allow user 16 to receive help or other information relating to tool 30, tool 32, tool 34, or system 10. For example, as illustrated in FIG. 4, a window 65 may appear with rating scale 60 in response to user 16 selecting symbol 64. Alternatively, rating scale 60 incorporating window 65 might appear in response to user 16 initially selecting icon 50, without requiring user 16 to first select symbol 64. Furthermore, as described more fully below with reference to FIG. 6, a pop-up window containing rating scale 60 associated with tool 32, one or more rating scales associated with tool 34, and a field to receive the comments or help requests may be presented to the user 16 in response to user 16 selecting symbol 64, selecting icon 50, or otherwise.

Figure 5:
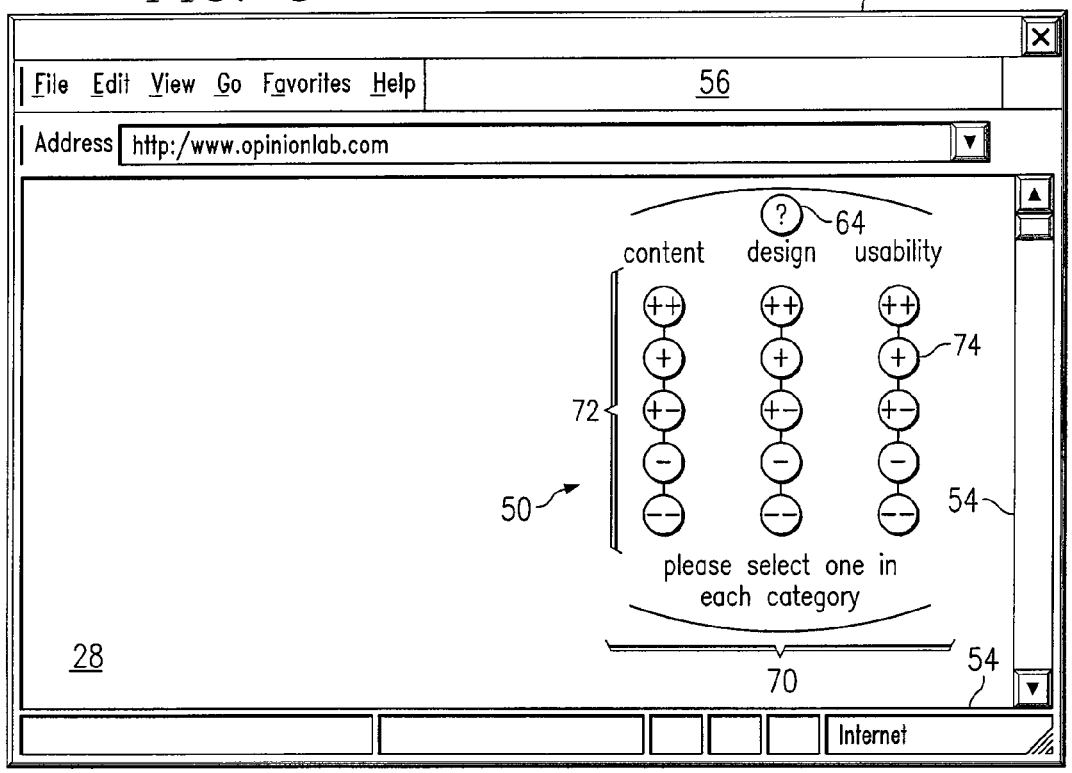
FIG. 5 illustrates an example web page incorporating a specific reaction measurement tool.

As illustrated in FIG. 5, in response to the user 16 rolling an associated mouse pointer over icon 50, pointing to and clicking on icon 50 using the mouse pointer, touching icon 50 using an associated touch screen, or selecting icon 50 in another appropriate manner, icon 50 may change into or otherwise be replaced with set 70 of one or more multi-level rating scales 72 corresponding to specific reaction measurement tool 34. Each of the rating scales 72 is used to measure the subjective reaction of user 16 to a specified aspect of the particular page 28, according to the same or a different multi-level rating scale as for tool 32. For example only and not by way of limitation, tool 30 may have separate rating scales 72 for measuring the subjective reaction of user 16 with respect to the content, design, usability, or other suitable aspects of page 28, singly or in any appropriate combination. As described above, reactions to page 28 may include responses to one or more explicit questions concerning page 28, concerning one or more elements of page 28, concerning one or more items with which page 28 is logically associated, or concerning other subject matter possibly unrelated to page 28.

In one embodiment, as for rating scale 60 of tool 32, each rating scale 72 includes five levels ranging from very negative to very positive, each level having an associated language-independent or other suitable symbol 74. For example only, a "−−" symbol 74 might correspond to a very negative rating, a "−" symbol 74 might correspond to a somewhat negative rating, a "+−" symbol 74 might correspond to a neutral rating, a "+" symbol 74 may correspond to a somewhat positive rating, and a "++" symbol 74 may correspond to a very positive rating. Although five level rating scales 72 are described, any suitable multi-level or other subjective rating scale or scheme may be employed without departing from the intended scope of the present invention. Each rating scale 72 of tool 34 may be substantially the same or may be differentiated from other rating scales 72 on one or more bases, for example, through the use of color, shading, shape, or other characteristic. Preferably, rating scales 72 are substantially similar to or otherwise consistent with rating scale 60 to maintain predictability, consistency, and acceptance within the user community.

To record a specific reaction to page 28, the user 16 clicks on, points to, or otherwise selects an appropriate symbol 74 reflective of that reaction. In response, tool 34 (or tool 30) may store corresponding user reaction information and cause the user reaction information to be communicated to server 18 for storage in database 36. In a particular embodiment, the reaction information collected in response to user 16 providing a specific reaction to the page 28 may include, in any combination and without limitation: (1) the title of page 28; (2) the URL for page 28; (3) the reaction user identifier; (4) the subjective ratings (for example only, "++," "+," "+−," "−," or "−−"); (5) the time and date the page 28 was accessed; (6) the time and date the subjective ratings were received; (7) web profile information for user 16; and (8) any other appropriate information. According to the demographic user identifier, if one is available at server 18, the demographic information for user 16 may be stored in association with the user reaction information in database 36, as described above. Tool 34 may require multiple ratings to be provided, one for each rating scale 72, before such information is stored.

One or more rating scales 72 may appear substantially simultaneously, in a suitable sequence, or in any other relative manner. For example, a succeeding rating scale 72 might appear only in response to a user 16 providing a specific user reaction at a preceding rating scale 72. Whether the succeeding rating scale 72 appears at all might depend on the nature of the specific reaction provided at the preceding rating scale 72. One or more child rating scales 72 may be nested with respect to a parent rating scale 72 on which child rating scales 72 depend within a hierarchy. One or more rating scales 72 may appear instead of or in addition to rating scale 60 and may appear before, substantially simultaneous with, or after rating scale 60. For example, one or more rating scales 72 might appear only in response to user 16 providing a general reaction using rating scale 60, or the rating scale 60 might appear only in response to user 16 providing a specific subjective reaction using one or more rating scales 72. Other suitable alternatives may be envisioned and the present invention is intended to encompass all such alternatives. In a particular embodiment, the rating scales 72 may rotate in their respective positions each time they appear to reduce or eliminate any response bias that might otherwise manifest itself as a result of the arrangement of rating scales 72.

Some or all of the stored information concerning page 28 may be provided to owner 12 in the form of one or more suitable reports to allow owner 12 to assess the success of the particular page 28 in the eyes of the user community. As described more fully above with reference to FIG. 1, icon 50 may cease to be viewable in browser window 52 after a specific reaction to page 28 has been received from user 16. Although in one embodiment only tool 34 (not tool 32) is visible on the page 28 in response to selection of tool 30, the present invention contemplates tool 32 being visible on page 28 instead of or in addition to tool 34.

In one embodiment, as described above, a question mark or other symbol 64 may be associated with the set 70 of rating scales 72 to allow the user 16 to provide comments relating to the page 28, one or more specified aspects of page 28, one or more items associated with page 28, or other appropriate comments. Symbol 64 might further allow user 16 to receive help or other information relating to tool 30, tool 32, tool 34, or system 10. For example, a window similar to the window 65 of FIG. 4 may appear with rating scales 72 in response to user 16 selecting symbol 64. Alternatively, rating scales 72 incorporating such a window might appear in response to user 16 initially selecting icon 50, without requiring user 16 to first select symbol 64. Moreover, as illustrated in FIG. 6, a pop-up window 78 containing rating scale 60 associated with tool 32, one or more rating scales 72 associated with tool 34, and a field 79 to receive comments or help requests might be presented to user 16 in response to user 16 selecting symbol 64, selecting icon 50, or otherwise. The present invention contemplates any technique for receiving comments or other textual input from user 16 in association with a particular page 28.

FIG. 7 illustrates an exemplary registration page 80 that may be sent to user 16 in response to user 16 providing a general or specific reaction to at least one page 28 of a website 26. Alternatively, user 16 may select a hypertext or other link within or associated with icon 50, rating scale 60, ratings scales 72, or window 78. The registration page 80 includes one or more suitable input fields 82 for receiving demographic information from user 16, which is then used to create a user profile for user 16 that is stored in database 40. In one embodiment, demographic information collected from user 16 may include, for example only and not by way of limitation, in any suitable combination: (1) a name; (2) an e-mail or other electronic address; (3) a residence, business, or other physical address; (4) a password; (5) a gender; (6) an age or age range; (7) a job title, position, profession, industry, or other employment information; (8) an employment status (for example, full-time, part-time, student, or retired); (9) number of persons in household; (10) a housing status (for example, homeowner or renter); (11) a highest level of education; (12) personal or household income or income range; (13) information concerning one or more activities of user 16, such as computer usage patterns and preferences; and (14) any other appropriate demographic information.

In one embodiment, as described above with reference to FIG. 1, after server 18 receives demographic information sufficient to establish a user profile for user 16, server 14 assigns a demographic user identifier to the user 16 and associates this demographic user identifier with the corresponding user profile in database 36. The demographic user identifier is stored on the user's computer system (in the form of a cookie, token, or other message) in response to the user 16 providing requested demographic information. In response to user 16 subsequently selecting tool 30 to provide a reaction, tool 30 recognizes user 16 according to the stored demographic user identifier and may convey a suitable message to indicate this recognition. For example, the tool 30 may replace the icon 50 with a personalized message (such as "Thanks, [name]") in response to user 16 providing a general or specific subjective reaction to a particular page 28. This message may be transient, disappearing after a specified time period, or may remain viewable in browser window 52 while the user 16 remains on the page 28. The demographic user identifier preferably matches the reaction user identifier for the user 16, which allows user reaction information and demographic information to be readily associated with one another at server 18. As described above, demographic information linked to reaction information may also facilitate the correlation of reaction information to other suitable metrics that are linked to demographic information.

As discussed above, website 26 may have a "topography" according to pages 28 of website 26 and the relationships between the pages 28. In one embodiment, system 10 provides owner 12 with the ability to access and readily navigate through reports, which provide rating information for pages 28 of website 26, in a similar manner as user 16 accesses pages 28 while navigating through website 26 according to the topography of website 26. Furthermore, the reports allow owner 12 to readily focus on pages 28 that are of most interest. For example only, and not by way of limitation, owner 12 may be particularly interested in accessing reaction information for any pages 28 that generated a significant percentage of very negative subjective reactions, whether the reactions are general or specific. As another example, owner 12 may be particularly interested in reviewing reaction information for any pages 28 that generated a significant percentage of very positive reactions among users 16 having specified demographic characteristics. The information is communicated to owner 12 from server 14, upon request, in the form of one or more suitable reports. Upon obtaining this information, which was unavailable using previous techniques, owner 12 may respond to improve website 26 and, quite possibly, the success of an associated business or other enterprise.

FIGS. 8 through 9 illustrate exemplary reports 100 for one or more pages 28 of website 26. Reports 100 are intended to provide the owner 12 with a readily understandable view of the user reactions for a particular page 28, a set of particular pages 28, or website 26 as a whole (considering all pages 28). As described above, reactions to page 28 may include responses to one or more explicit questions about page 28, one or more elements of page 28, one or more items with which page 28 is logically associated, or any other suitable subject. Reports 100 may reflect only user reactions collected during a specified time period or might reflect all user reactions collected since tool 30 was incorporated to the particular page 28 or pages 28 that reports 100 concern. As an example, reports 100 for successive time periods might allow owner 12 to identify trends in the user reaction information and to respond appropriately. Reports 100 may reflect only the reactions collected from users 16 having a specified user profile or one or more specified demographic characteristics, or may reflect all user reactions collected for the particular page 28 or pages 28 of interest. The present invention contemplates one or more reports 100 to provide the owner 12 with any information collected using tools 30, 32, or 34, in a format appropriate for owner 12.

Figure 8A:
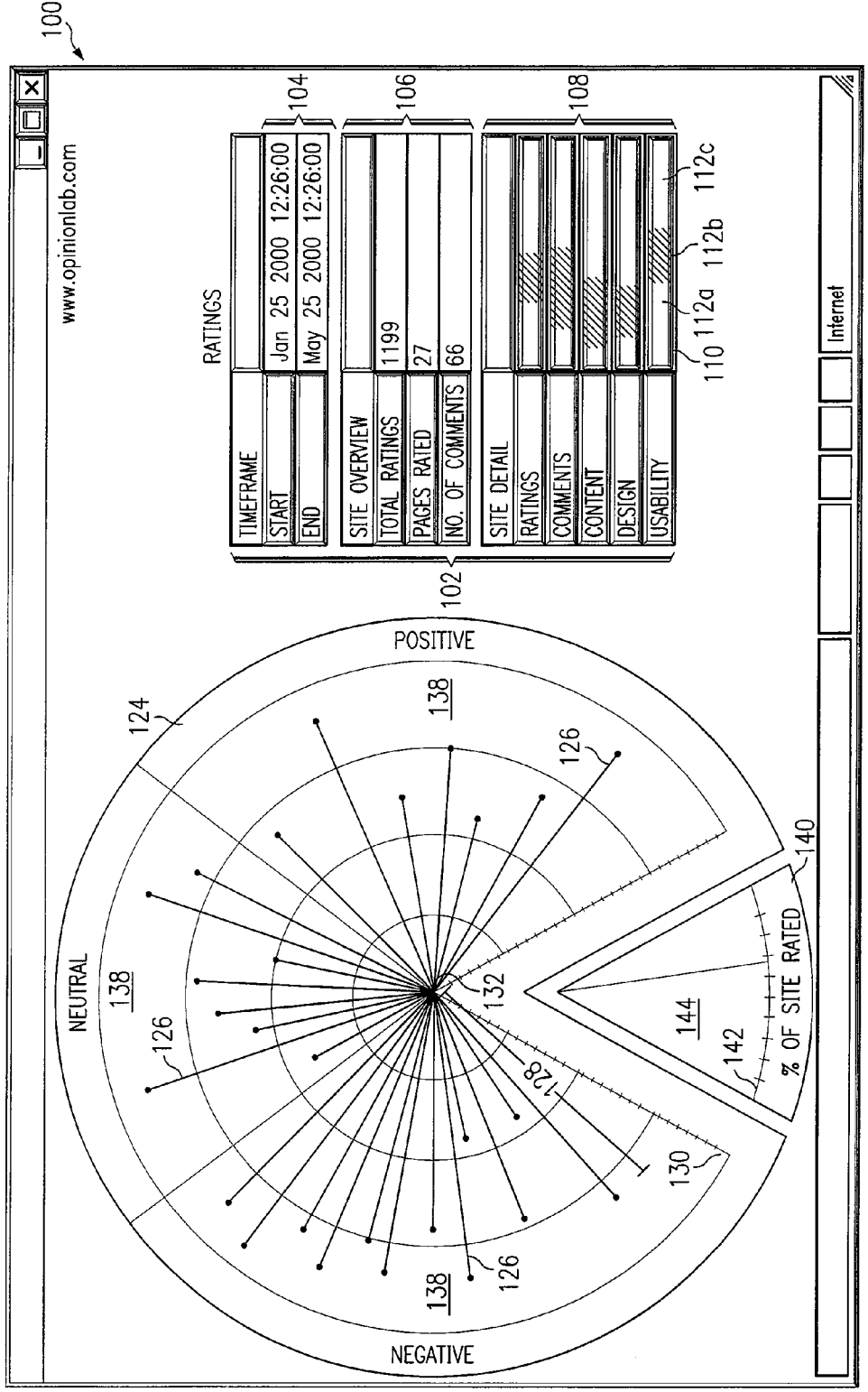
FIGS. 8A and 8B illustrate example site level reports.

For example, as shown in FIG. 8A for a website 26 as a whole, ratings table 102 may include a timeframe 104 during which user reactions of ratings table 102 were collected. A website overview 106 might include, in any combination and without limitation: (1) the number of ratings for all pages 28 of website 26 (generally or as to one or more specific aspects); (2) the number of one or more specified types of ratings for all pages 28, such as the number of negative ratings (generally or as to one or more specific aspects); (3) the number of unrated pages 28 among all pages 28 (where user 16 accessed page 28 incorporating tool 30 but did not provide a rating); (4) the number of positively rated pages 28 (generally or as to one or more specific aspects) among all the pages 28 (which might include, for example, both positive ratings and very positive ratings according to rating scale 60 or 72 described above); (5) the number of neutrally rated pages 28 (generally or as to one or more specific aspects) among all of the pages 28; (6) the number of negatively rated pages 28 (generally or as to one or more specific aspects) among all pages 28 (which may include, for example, both negative ratings and very negative ratings according to rating scale 60 or 72); (7) the number of ratings for the page 28 with the most ratings or most ratings of a specified type, such as the most negative ratings (generally or as to one or more specific aspects); (8) the number of comments received in connection with all pages 28; (9) and any other suitable rating information concerning website 26, considering all the pages 28. In the alternative, the ratings table 102 might provide similar information concerning one or more particular pages 28.

In one embodiment, a site detail 108 may provide any of the site level rating information described above in a more visually appealing and readily interpretable manner. The site detail 108 may provide a "sliding" or other appropriate scale 110 indicating, for a selected category of site level rating information, the percentages of ratings that are negative, neutral, and positive. For example, the site detail 108 may include a sliding scale 110 for a "usability" aspect of pages 28. Sliding scale 110 might include a first portion 112a indicating the percentage of negative ratings as to usability, a second portion 112b indicating the percentage of neutral ratings as to usability, and a third portion 112c indicating the percentage of positive ratings as to usability. More or fewer portions 112 that reflect finer or coarser rating variations may be provided according to particular needs. Portions 112 may be differentiated from one another using color, shading, or other suitable indicia. For example only, first portion 112a may be red, second portion 112b may be black, and third portion 112c may be green. The present invention contemplates providing site level rating information to owner 12 in any suitable format.

Figure 8B:
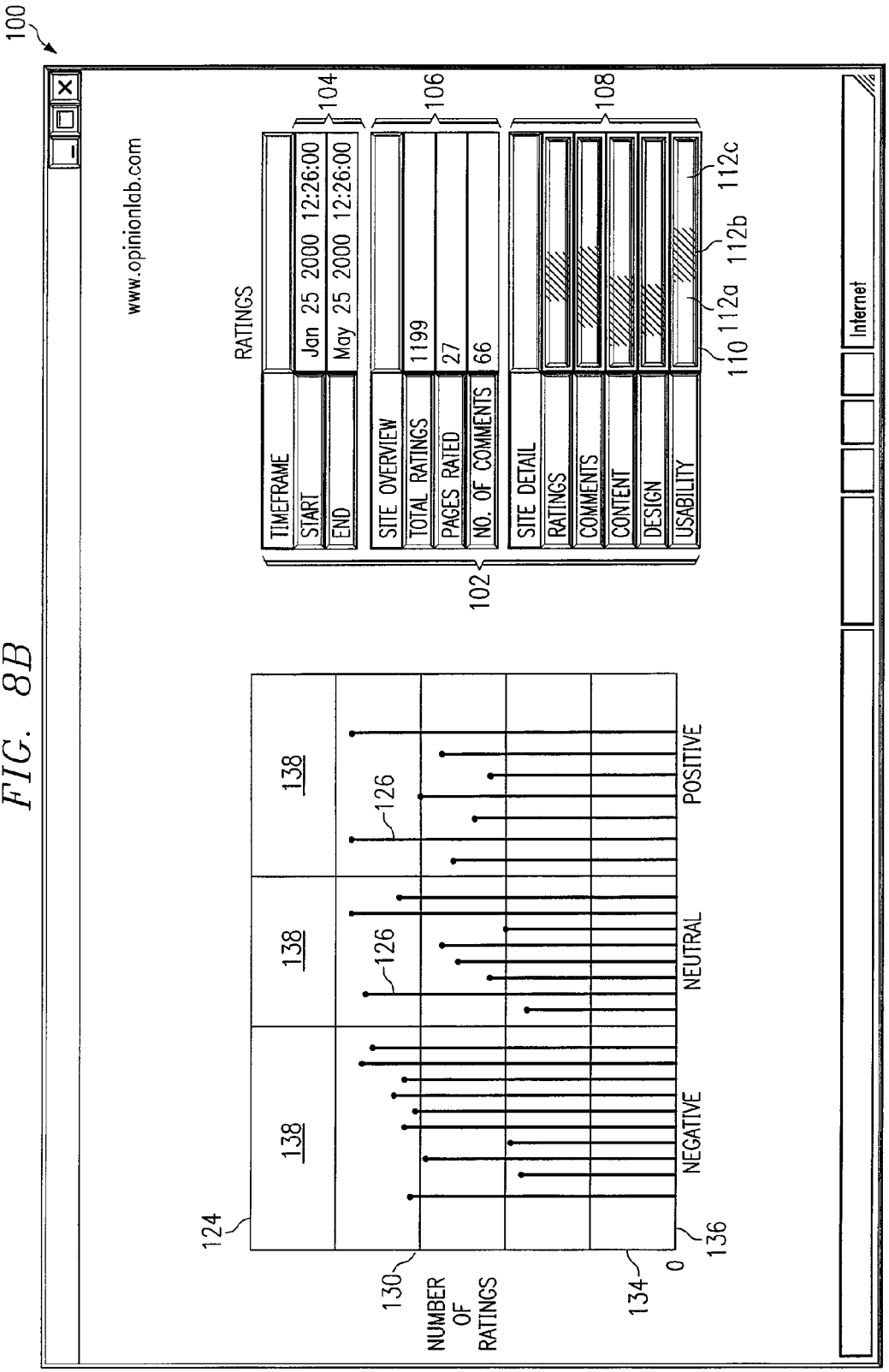

In one embodiment, as shown in FIG. 8A, report 100 reflects user reaction information for website 26 using a chart 124 having a ray, arrow, bar, or other line 126 for each page 28 of website 26. The lengths 128 of lines 126 along scale 130 represent the total number of ratings received for the corresponding pages 28. Chart 124 may be substantially circular at least in part, as illustrated, with lines 126 that extend outward from its center 132, or may have any other suitable shape. As an example, as illustrated in FIG. 8B, chart 124 may include a "flat" version of chart 124 having a scale 130 in the direction of a first axis 134 and lines 126 extending in the direction of the first axis 134 from a second axis 136 that is perpendicular to the first axis 134. Those skilled in the art will readily appreciate that other suitable schemes for representing the ratings associated with a particular page 28, including color for example, may be used without departing from the intended scope of the present invention. In one embodiment, when a mouse pointer is rolled across the tip of line 126 or line 126 is otherwise selected, the title of, the URL for, a link to, a report concerning, or other information relating to corresponding page 28 appears instead of, on top of, near, or otherwise in association with line 126. If a report for page 28 is generated, the report may replace report 100, similar to the manner in which a newly accessed page 28 may replace a previously accessed page 28 within a user's browser window.

In one embodiment, referring again to FIG. 8A, chart 124 may include a number of regions 138, as an example, negative region 138, neutral region 138, and positive region 138. The position of line 126 relative to regions 138 may reflect the average rating for associated page 28 (or other mathematical operation on ratings for associated page 28). For example only and without limitation, if the ratings on five level rating scale 60 are assigned values of "1" through "5" with "1" being for a very negative rating, the average value for page 28 might be "2.5" and the corresponding line 126 might be positioned near the border between negative and neutral regions 138. Regions 138 may each have the same or no color, each region 138 may have a different color, or the colors of regions 138 may transition smoothly across regions 138. Instead of or in addition to colored regions 138, lines 126 may be colored according to their positions relative to regions 138. For example only and without limitation, line 26 reflecting an average rating of "1.4" might be substantially red, a line 26 reflecting an average rating of "3.3" might be substantially black, and line 26 reflecting an average rating of "4.2" might be substantially green. Color may be used in any suitable manner to convey user reaction information for one or more pages 28 of website 26.

According to the above, if multiple pages 28 have the same average rating, their lines 126 will overlap on chart 124. To avoid confusion in such cases, shorter lines 126 in such a group (having fewer ratings) may terminate in a white circle rather than a colored circle or may be differentiated in any other suitable manner from the longest line 126 in the group (having the most ratings) and from each other. Such a differentiator may also be desirable where lines 126 do not have the same average rating, and thus do not precisely overlap, but have ratings similar enough to make lines 126 difficult to distinguish from one another. In one embodiment, pages 28 having a substantially neutral average rating but bimodal distributions (according to any suitable formula) may be represented using lines 126 that terminate in a red circle rather than a black circle or are differentiated in another suitable manner from any other lines 126 that reflect substantially neutral average ratings. For any subjective rating described above, the present invention contemplates the rating being according to rating scale 60, one or more rating scales 72, or any other appropriate rating scale. Ratings for one scale, scale 60 for example, may be distinguished from ratings for another scale, scale 72 for example, using any suitable visual indicator in the same or a different chart 124, according to particular needs.

As discussed, instead of or in addition to reflecting user reaction information for one or more particular pages 28 of website 26, chart 124 may reflect user reaction information for website 26 as a whole using a single line 126 that takes into account all pages 28 of website 26. For example, and not by way of limitation, chart 124 may include colored regions 138 as described above and a single line 126 having a length reflecting the number of ratings for all the pages 28 of website 26, according to scale 130, and having a position reflecting the average value of ratings for all pages 28 of website 26. Such a line 126 for website 26 as a whole may be superimposed on chart 124 having lines 126 for particular pages 28 of website 26, may be within a separate window of chart 124, or may have any other suitable spatial relationship to chart 124 having lines 126 for particular pages 28 of website 26. Furthermore, such lines 126 may be used to represent the average rating value for multiple websites 26 on the same chart 100, for example, some or all websites 26 associated with a particular owner 12. Websites 26 for which chart 100 reflects average rating values may be selected according to their owners 12, the industries with which the websites 26 are associated, or other suitable selection criteria.

Benchmarks may be established and reflected in report 100, along with the average rating values for one or more websites 26, for purposes of comparison. For example, as discussed above, report 100 may reflect an overall rating for website 26 according to the average (or other mathematical operation) of ratings for pages 28 of website 26. Overall ratings for other websites 26 that are associated with the same industry or otherwise comparable with the particular website 26 may be generated in an analogous manner. Comparing the overall rating for the particular website 26 with the overall ratings of other websites 26, singly or as a group, may provide valuable information to owner 12. Furthermore, overall ratings for multiple websites 26 may be evaluated in some manner to generate a website index value for each website 26 relative to other comparable websites 26. In one embodiment, such a website index might be updated once a month or otherwise to allow owner 12 to readily track the overall performance of website 26 relative to its peers. An overall rating assigned to website 26 in the manner described above, according to subjective ratings for pages 28 of the website 26, may provide owner 12 with more meaningful information about the effectiveness of website 26 than collecting subjective ratings that each concern only website 26 as a whole.

In one embodiment, report 100 may also include a chart 140, integral to or separate from chart 124, providing a percentage or other relative portion of pages 28 of website 26 that have been rated. For example, and without limitation, if chart 124 is substantially circular as illustrated in FIG. 8A, chart 140 may be located in a sector of chart 124 to allow the owner 12 to appreciate the information in charts 124 and 138 substantially simultaneously. The percentage of other relative portion of rated pages 28 may be indicated using a scale 142 or according to the amount 144 of the chart 140 that is colored, filled, or otherwise indicated as corresponding to that percentage or other relative portion. Providing site level rating information to the owner 12 in an integrated and readily understandable manner using report 100 is an important technical advantage of embodiments of the present invention.

FIG. 9 illustrates an exemplary report 150 for a particular page 28 of website 26. Similar to report 100 for website 26 as a whole, report 100 for page 28 may include ratings table 152 having a timeframe 154 during which user reactions of ratings table 152 were collected. A page overview 156 may include, in any suitable combination and without limitation: (1) the number of ratings for page 28 (generally or as to one or more specific aspects); (2) the number of one or more specified types of ratings for page 28, such as the number of negative ratings (generally or as to one or more specific aspects); (3) the number of positive ratings for page 28 (generally or as to one or more specific aspects), which may include both positive ratings and very positive ratings according to rating scale 60 or 72; (4) the number of neutral ratings for the page 28 (generally or as to one or more specific aspects); (5) the number of negative ratings for page 28 (generally or as to one or more specific aspects), which may include both negative ratings and very negative ratings according to rating scale 60 or 72; (6) the number of comments received in connection with page 28; (7) and any other suitable rating information concerning page 28.

In one embodiment, page detail 158 may provide any of the page level rating information described above in a more visually appealing and readily interpretable manner. The page detail 158 may provide a "sliding" or other appropriate scale 160 indicating, for a selected category of page level rating information, the percentages of ratings that are negative, neutral, and positive. For example, the page detail 158 may include a sliding scale 160 for the "usability" aspect of page 28. Sliding scale 160 may include a first portion 162a indicating the percentage of negative ratings as to usability, a second portion 162b indicating the percentage of neutral ratings as to usability, and a third portion 162c indicating the percentage of positive ratings as to usability. More or fewer portions 162 that reflect finer or coarser rating variations may be provided according to particular needs. Portions 162 may be differentiated from one another using color, shading, or other suitable indicia. For example only, first portion 162a may be red, second portion 162b may be black, and third portion 162c may be green. The present invention contemplates providing page level rating information to the owner 12 in any appropriate format.

In one embodiment, report 150 reflects user reaction information for page 28 using a chart 164 having a scale 166 in the direction of a first axis 168 and a set of bars, boxes, banners, or other lines 170 extending in the direction of first axis 168 from a second axis 172 that is perpendicular to the first axis 168. The position of a line 170 along second axis 172 reflects the type of rating line 170 represents. The length of line 170 according to scale 166 reflects the number of ratings of that type for page 28. The present invention contemplates chart 164 being "flat" as shown, being substantially circular similar to chart 124 shown in FIG. 8A, or having any other suitable configuration. In one embodiment, owner 12 may move from report 100 to any associated report 150 or to another report 100 for another website 26, may move from any report 150 to associated report 100, or may move in any other appropriate manner between reports 100 and 150 in assessing the user reaction information for one or more websites 26 and their pages 28.

A report 150 for a particular page 28 may provide hypertext or other suitable links to reports 150 for other pages 28 that may be linked to the particular page 28 according to the unique topography of website 26. For example, if a first page 28 allows users 16 to access either a second page 28, a third page 28, or a fourth page 28, report 150 for the first page 28 might similarly allow owner 12 to access at least the reports 150 for the second page 28, for the third page 28, and for the fourth page 28. Report 150 for the first page 28 might further allow owner 12 to access the parent page 28 of the first page 28; that is, the page 28 at an adjacent higher level within a hierarchical topography of website 26 from which user 16 might navigate to the first page 28. In one embodiment, reporting module 46 generates reports 150 "on the fly" in response to specific requests received from the owner 12 using network 20. For example, reporting module 46 might access one or more databases 36, 40, and 44 to generate report 150 in response to owner 12 clicking on, pointing to, or otherwise selecting a link to a second page 28 while viewing report 150 for a first page 28. Reporting module 46, through reports 150, allows owner 12 to navigate through user reaction information pertaining to the pages 28 of website 26 in much the same manner that users 16 navigate through the pages 28 of website 26 when accessing website 26 for their needs, according to the topography of website 26, providing an important technical advantage.

Instead of or in addition to reports 100 and 150, reports may be provided to owner 12 according to one or more points of view that relate to rating distribution, rating values, rating submission, rating demographics, or other suitable criteria for one or more pages 28. For example, and not by way of limitation, such reports may include: (1) a report of the distribution of ratings (number of ratings for each rating value) for a page 28 overall, for page 28 for a specified demographic profile (such as all women), or for page 28 for a target demographic profile of owner 12 (such as all women over 65 years old that live in Chicago and own their residence); (2) a report ranking, for one or more demographics (such as age), the top one or more categories (such as 18-25 year old) for those demographics in terms of percentage of ratings provided, percentage of ratings provided of a specified type, or any other suitable rating information; (3) a report of the percentage occurrence of each rating value (or one or more selected rating values) for one or more demographics (such as age) or one or more demographic categories (such as 18-25 year old); (4) a report of the number or the percentage of ratings (or ratings of one or more specified types) versus the submission time and date (or time and date range); (5) a report of the distribution of ratings sorted according to the time spent on page 28 before rating submission; (6) a report of the top one or more IP addresses for users 16 submitting ratings for a time and date (or time and date range); and (7) any other suitable report reflecting user reaction information, demographic information, and any other collected information, according to particular needs. Although such point of view reports are described as being separate from reports 100 and 150, reports 100 and 150 may convey similar information. In one embodiment, for example, a particular point of view report might resemble report 150 illustrated in FIG. 9.

Figure 10:
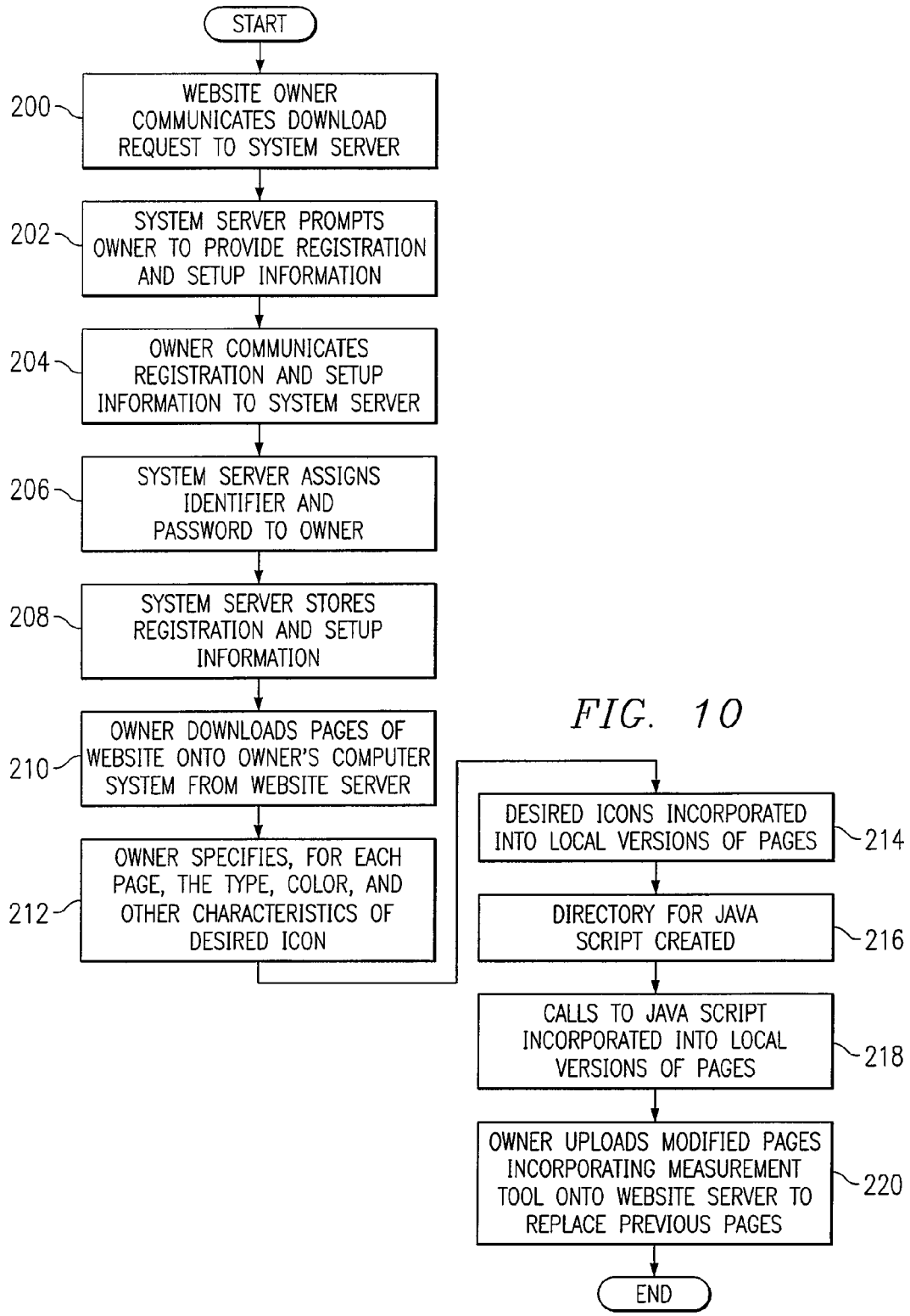
FIG. 10 illustrates an example method of incorporating a user reaction measurement tool into particular web pages of a website.

FIG. 10 illustrates an exemplary method of incorporating tool 30 into one or more particular pages 28 of website 26. The method begins at step 200, where owner 12 communicates a download or other suitable request to server 18 (shown in FIGS. 10 through 12 as "system server 18" to distinguish it from server 14, shown in FIGS. 10 through 12 as "website server 14"). At step 202, server 18 prompts owner 12 to provide identification, billing, and any other suitable registration and setup information. At step 204, owner 12 communicates the requested information to the server 18 (whether or not the server 18 is local to or distributed from owner 12). Server 18 may also notify owner 12 that website 26 may be crawled to identify and gather data pertaining to pages 28, may provide owner 12 with a license agreement and other information concerning the services to be provided to owner 12, or may communicate any other suitable information with owner 12. At step 206, server 18 may assign an owner identifier and password to owner 12 to allow the owner 12 to access reports 100. Server 18 stores the registration and setup information for owner 12 in an appropriate storage location (not explicitly shown) at step 208 to complete registration and setup of owner 12.

At step 210, to incorporate tool 30 into one or more pages 28 of website 26, owner 12 downloads or otherwise communicates pages 28 (or copies of pages 28) from server 14 to the owner's computer system, preferably using a suitable wizard or other software component designed to facilitate the incorporation process. At step 212, owner 12 specifies, for each page 28, the type (for example, spinning between "(+)" and "(−)"), color, or any other appropriate characteristic of the desired icon 50 for page 28. For example and without limitation, the owner 12 may click on desired icon 50, which might be one of multiple standard icons 50, and modify one or more characteristics of icon 50 using suitable pull down menus. As described above, the characteristics of the icon might include one or more explicit questions concerning page 28, concerning one or more visual, audible, or other elements of page 28, or concerning one or more items with which page 28 is logically associated. Desired icons 50 are incorporated into local versions of pages 28 at step 214, singly or as a group. For example and not by way of limitation, owner 12 may click on, drag and drop, or otherwise incorporate desired icons 50 into the local version of pages 28, singly or as a group. Alternatively, the incorporation might occur automatically in response to owner 12 simply specifying characteristics of icon 50.

Owner 12, through the wizard or in any other suitable manner, may create a separate directory containing a JAVA-SCRIPT or other script embodying tool 30 at step 216 and, at step 218, may paste or otherwise incorporate a suitable call to the script into the software code of the local version of page 28. After the tool 30 is incorporated into the local versions of pages 28, owner 12 may use the wizard to upload or otherwise communicate modified pages 28 (now incorporating tool 30) to server 14 at step 220, singly or as a group, to replace corresponding pages 28 (not incorporating tool 30) in website 26. While an particular exemplary embodiment is described in detail, tool 30 may be incorporated in one or more pages 28 of a website 26 in any suitable manner without departing from the intended scope of the present invention. For example, as an alternative, server 18 may communicate tool 30 and associated software components directly to server 14 for automatic incorporation into pages 28, in response to a download request from owner 12. After the pages 28 incorporating tool 30 are then uploaded to server 14, the method ends. Tool 30 is communicated with page 28 to user 16 in response to user 16 accessing page 28 during a browser session.

Figure 11:
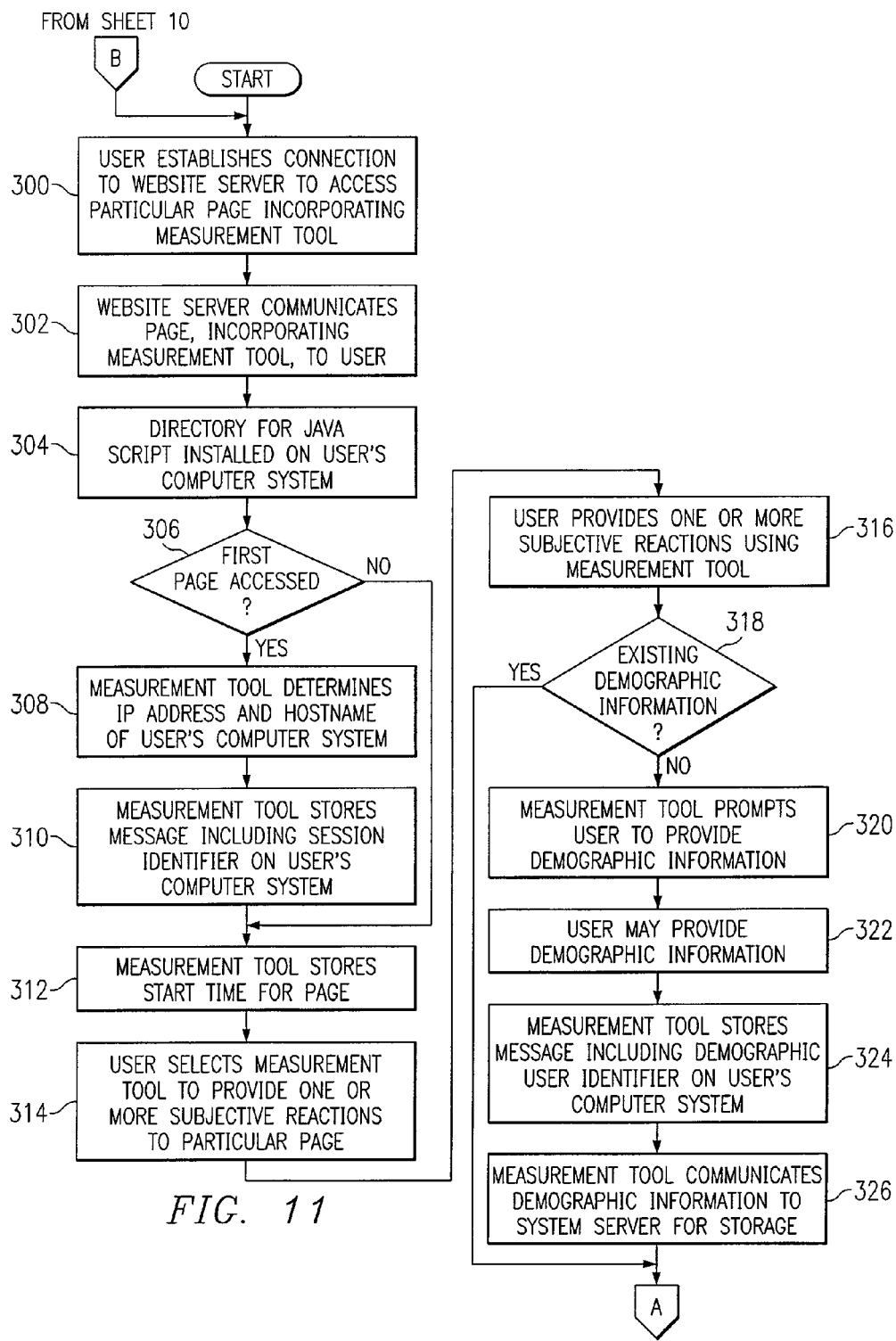
FIG. 11 illustrates an example method of measuring a user's reactions to particular web pages of a website.

FIG. 11 illustrates an exemplary method of measuring reactions of user 16 to one or more particular pages 28 of website 26. The method begins at step 300, where user 16 establishes a connection to server 14 to access a particular page 28 of website 26 incorporating tool 30. At step 302, server 14 communicates page 28, with incorporated tool 30, to user 16 and, at step 304, a separate directory containing the script associated with tool 30 is installed in some appropriate manner on the user's computer system. If page 28 is the first page 28 incorporating tool 30 that the user 16 has accessed during the browser session at step 306, tool 30 attempts to determine at step 308 the IP or other electronic address for the user's computer system and, when technically feasible, the hostname for the user's computer system. At step 310, the tool 30 attempts to store a cookie, token, or other appropriate message on the user's computer system, through the user's web browser or otherwise, containing the session identifier for the browser session. At step 312, tool 30 may also store the time and date at which user 16 accessed the page 28. At step 306, if page 28 is not the first page 28 incorporating tool 30 that user 16 has accessed during the browser session, the method may proceed directly to step 312. The present invention contemplates steps 304 through 312 occurring in any appropriate order, according to particular needs.

At step 314, user 16 rolls an associated mouse pointer over icon 50, points to and clicks on icon 50 using the mouse pointer, touches icon 50 using an associated touch screen, or otherwise selects tool 30 to provide one or more subjective reactions to the particular page 28. As described more fully above, a multi-level subjective rating scale 60 associated with tool 32 may request user 16 to provide a general reaction to page 28, one or more multi-level subjective rating scales 72 associated with tool 34 may request the user 16 to provide one or more specific reactions to the page 28, rating scale 60 and one or more rating scales 72 may appear in combination to request a combination of general and specific reactions to the page 28, or one or more user reactions to the particular page 28 may be requested in any other suitable manner. In one embodiment, as described above, a reaction to page 28 may include one or more responses to explicit questions posed to user 16 concerning page 28, concerning one or more elements of page 28, or concerning one or more items with which page 28 is logically associated. Such questions may be presented to user 16 instead of or in addition to a rating scale 60 or 72. At step 316, user 16 provides one or more reactions using a suitable combination of tools 30, 32, and 34.

If tool 30 determines at step 318 that user 16 has not previously provided demographic information, based on the absence on the user's computer system of a cookie, token, or other message including a demographic user identifier, the tool 30 may prompt user 16 to provide sufficient demographic information using registration page 80 at step 320. If user 16 provides requested demographic information at step 322, tool 30 attempts to store a cookie, token, or other suitable message including a demographic user identifier on the user's computer system at step 324. Tool 30 may communicate the demographic information and demographic user identifier to server 18 at step 326 for storage in database 40. Alternatively, the tool 30 may wait to communicate the demographic information together with user reaction information described below. At step 328, tool 30 attempts to store a cookie, token, or other suitable message including a reaction user identifier on the user's computer system, preferably the same as the demographic user identifier described above. If tool 30 determines at step 318 that user 16 previously provided demographic information (in the same or in a previous browser session), based on there being a cookie, token, or other suitable message including a demographic user identifier stored on the user's computer system, the method may proceed directly to step 328. Step 328 may occur before, during, or after steps 318 through 326, as appropriate.

At step 330, tool 30 temporarily stores reaction information on the computer system of user 16 and instructs the computer system to communicate the reaction information to server 18. In one embodiment, the reaction information for page 28 may include, in any suitable combination and without limitation, the title, the URL, the start time and date, the reaction time and date, the user reaction, the reaction user identifier, and web profile information. Tool 30 may continue to store the reaction user identifier for determining, in response to the user 16 subsequently accessing the particular page 28, that user 16 has already accessed the particular page 28. Tool 30 communicates reaction information, using the computer system of user 16, to server 18 at step 332. At step 334, tool 30 may cause an icon 50 to become unviewable on the particular page 28 for the remainder of the browser session, until user 16 leaves the page 28 (being viewable again if user 16 returns to the page 28 during the browser session), or for any other suitable period.

At step 336, server 18 manipulates and stores reaction information received from tool 30. For example, server 18 may compute the time spent on the page 28 before user 16 provided the reaction. Server 18 stores any such computed reaction information, together with suitable reaction information received from tool 30, in database 36. If the received reaction information included a reaction user identifier, server 18 may attempt to match the reaction user identifier with a demographic user identifier stored in database 40, to allow the server 18 to associate the demographic information for user 16 with the reaction information in database 36. If user 16 has closed the web browser to terminate the browser session at step 338, the cookies, tokens, or other messages stored on the user's computer system containing the session identifier and reaction user identifier may expire at step 340, and the method ends. If user 16 instead accesses another page 28 that incorporates tool 30 during the browser session, the method returns to step 300.

FIG. 12 illustrates an exemplary method of reporting to owner 12 user reactions to one or more particular web pages 28 of a website 26. The method begins at step 400, where collection module 42 may perform a crawl or otherwise identify the pages 28 of website 26 incorporating tool 30. At step 402, collection module 42 may parse pages 28 to identify their titles, URLs, and any other appropriate information. At step 404, the collection module 42 may generate a map or other report concerning the topography of website 26 and, at step 406, store the map in the database 44. At step 408, owner 12 communicates a report request to server 18 and, at step 410, the reporting module 46 prompts owner 12 to specify one or more criteria for use in generating the requested report 100. Owner 12 provides the requested report criteria at step 412.

The report criteria may include, for example and not by way of limitation: (1) whether a ratings table 102 or 152 is to be displayed; (2) the desired information that is to appear in the ratings table 102 or 152; (3) whether a chart 124 or 164 is to be displayed, instead of or in addition to ratings table 102 or 152, respectively; (4) the type of chart 124 or 164 to be displayed (for example, chart 124 of FIG. 8A or chart 124 of FIG. 8B); (5) the desired information to appear in chart 124 or 164; (6) how the desired information is to be displayed in chart 124 or 164 (for example, specifying the use of color for regions 138 and lines 126); (7) whether chart 140 is to be displayed, instead of or in addition to ratings table 102 or chart 124; (8) a point of view for the report 100 or 150 (for example, specifying one or more demographic characteristics to which the report 100 or 150 is to be limited, one or more time periods to which report 100 or 150 is to be limited, or any other suitable points of view); and (9) any other suitable report criteria.

At step 414, reporting module 24 accesses the map for website 26 stored in database 44, reaction information for pages 28 stored in database 36, and possibly demographic information for users 16 stored in database 40. As described above, the demographic information relating to particular reaction information may be stored in association with the reaction information, in database 36 for example, when reaction information is received and processed. As a result, the reporting module 46 may not need to access database 40 to generate report 100 or 150. At step 416, reporting module 46 then generates the requested report 100 or 150, concerning one or more particular pages 28 of website 26, according to the specified report criteria. In one embodiment, reporting module 46 generates report 100 or 150 on the fly in response to the specific report request from owner 12, without having previously stored report 100 or 150. At step 418, the reporting module 46 then communicates the requested report 100 or 150 to owner 12.

If the owner 12 wishes to access another report 100 or 150 at step 420, the method returns to step 412, where the owner 12 provides new report criteria. In a particular embodiment, report 100 or 150 may provide hypertext or other appropriate links that, when selected, cause reporting module 46 to generate a new report 100 or 150 according to the selected link. The present invention contemplates owner 12 specifying new report criteria through selection of such a link, in the manner that owner 12 specified the original report criteria, or in any other appropriate manner. Preferably, owner 12 may navigate through at least reports 150 in substantially the same manner that users 16 might navigate through various pages 28 of website 26, according to the topography of website 26. As described above, this feature provides an important technical advantage of embodiments of the present invention. Steps 412 through 420 may be repeated as many times as necessary or desirable to satisfy the needs of the owner 12. If the owner 12 does not wish to access another report 100 or 150 at step 420, the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. One or more computer-readable non-transitory storage media embodying software operable when executed to:
provide a user-selectable element viewable on each of a plurality of particular web pages of a website upon initial display of a particular web page and soliciting page-specific user feedback concerning the particular web page upon initial display of the particular web page, the user-selectable element appearing identically and behaving consistently on each of the plurality of particular web pages; and
receive the page-specific user feedback concerning the particular web page for reporting to an interested party, the page-specific user feedback concerning the particular webpages having been provided by a user while the user remained at the particular web page, and the page-specific user feedback comprising one or more page-specific subjective ratings of the particular web page and one or more associated page-specific open-ended comments concerning the particular web page, the page-specific user feedback allowing the interested party to access page-specific subjective ratings and associated page-specific open-ended comments across the plurality of particular web pages to identify one or more particular web pages for which the page-specific user feedback is notable relative to page-specific user feedback for other particular web pages;
wherein the user-selectable element is viewable within a browser window upon initial display of the particular web page and remains viewable within the browser window, at least prior to the user selection, regardless of user scrolling.

2. The media of claim 1, wherein the software associated with the user-selectable element is incorporated into software of each of the plurality of particular web pages.

3. The media of claim 1, wherein the software associated with the user-selectable element comprises a call to a directory containing a script.

4. The media of claim 1, wherein the software associated with the user-selectable element is incorporated into a web browser of the user.

5. The media of claim 1, wherein each page-specific subjective rating comprises one of:
a page-specific subjective rating of the particular web page as a whole; and
a specific page-specific subjective rating of at least one characteristic of the particular web page as a whole.

6. The media of claim 1, wherein the page-specific user feedback comprises a response to an explicit question presented to the user.

7. The media of claim 1, wherein the software associated with the user-selectable element is operable to receive demographic information from the user, in response to the page-specific user feedback concerning the particular web page, for reporting to the interested party in association with the page-specific user feedback concerning the particular web page.

8. The media of claim 1, wherein the plurality of particular web pages comprises substantially all web pages of the website.

9. The media of claim 1, residing at one or more of:
one or more first computer systems hosting one or more of the plurality of particular web pages;
one or more second computer systems associated with the interested party; or
one or more third computer systems associated with a user who has accessed one or more of the plurality of particular web pages.

10. One or more computer-readable non-transitory storage media embodying software operable when executed to:
provide a first element viewable on each of a plurality of particular web pages of a website upon initial display of a particular web page and soliciting page-specific user feedback concerning the particular web page upon initial display of the particular web page, the first element appearing identically and behaving consistently on each of the plurality of particular web pages;
provide a second element displayed in response to user selection of the first element and soliciting one or more page-specific subjective ratings of the particular web page and one or more associated page-specific open-ended comments concerning the particular web page, the second element appearing identically and behaving consistently each time it is displayed in response to user selection of the first element viewable on a particular web page;
receive the user selection of the first element and initiate display of the second element in response; and
receive the page-specific user feedback comprising one or more page-specific subjective ratings of the particular web page and one or more associated page-specific open-ended comments concerning the particular web page for reporting to an interested party, the page-specific user feedback concerning the particular webpages having been provided by a user while the user remained at the particular web page, and the page-specific user feedback allowing the interested party to access page-specific subjective ratings and associated page-specific open-ended comments across the plurality of particular web pages to identify one or more particular web pages for which the page-specific user feedback is notable relative to page-specific user feedback for other particular web pages;

wherein the first element is viewable within a browser window upon initial display of the particular web page and remains viewable within the browse window, at east prior to the user selection, regardless of user scrolling.

11. The media of claim 10, wherein the software associated with the first element is incorporated into software of each of the plurality of particular web pages.

12. The media of claim 10, wherein the software associated with the second element comprises a call to a directory containing a script to receive the page-specific user feedback.

13. The media of claim 10, wherein the software associated with the first element is incorporated into a web browser of the user.

14. The media of claim 10, wherein each page-specific subjective rating comprises one of:
    a page-specific subjective rating of the particular web page as a whole; and
    a specific page-specific subjective rating of at least one characteristic of the particular web page as a whole.

15. The media of claim 10, wherein the page-specific user feedback comprises a response to an explicit question presented to the user.

16. The media of claim 10, wherein the software associated with the second element is operable to receive demographic information from the user, in response to the page-specific user feedback concerning the particular web page, for reporting to the interested party in association with the page-specific user feedback concerning the particular web page.

17. The media of claim 10, wherein the plurality of particular web pages comprises substantially all web pages of the website.

18. A method comprising:
    using a user-selectable element viewable on each of a plurality of particular web pages of a website upon initial display of a particular web page to solicit page-specific user feedback concerning the particular web page from the user, the user-selectable element appearing identically and behaving consistently on each of the plurality of particular web pages; and
    using software associated with the user-selectable element to receive the page-specific user feedback concerning the particular web page for reporting to an interested party, the page-specific user feedback concerning the particular webpages having been provided by a user while the user remained at the particular web page, and the page-specific user feedback comprising one or more page-specific subjective ratings of the particular web page and one or more associated page-specific open-ended comments concerning the particular web page, the page-specific user feedback allowing the interested party to access page-specific subjective ratings and associated page-specific open-ended comments across the plurality of particular web pages to identify one or more particular web pages for which the page-specific user feedback is notable relative to page-specific user feedback for other particular web pages;
    wherein: the user-selectable element is viewable within a browser window upon initial display of the particular web page; and the method further comprises causing the user-selectable element to remain viewable within the browser window, at least prior to the user selection, regardless of user scrolling.

19. The method of claim 18, wherein the software associated with the user-selectable element is incorporated into software of each of the plurality of particular web pages.

20. The method of claim 18, further comprising using the software associated with the user-selectable element to call a directory containing a script.

21. The method of claim 18, wherein the software associated with the user-selectable element is incorporated into a web browser of the user.

22. The method of claim 18, wherein each page-specific subjective rating comprises one of:
    a page-specific subjective rating of the particular web page as a whole; and
    a specific page-specific subjective rating of at least one characteristic of the particular web page as a whole.

23. The method of claim 18, wherein the page-specific user feedback comprises a user response to an explicit question presented to the user.

24. The method of claim 18, further comprising using software associated with the user-selectable element to receive demographic information from a user, in response to the page-specific user feedback concerning the particular web page, for reporting to the interested party in association with the page-specific user feedback concerning the particular web page.

25. The method of claim 18, wherein the plurality of particular web pages comprises substantially all web pages of the website.

26. A method comprising:
    using a first element viewable on each of a plurality of particular web pages of a website upon initial display of a particular web page to solicit page-specific user feedback concerning the particular web page, the first element appearing identically and behaving consistently on each of the plurality of particular web pages;
    using a second element displayed in response to user selection of the first element to solicit one or more page-specific subjective ratings of the particular web page and one or more associated page-specific open-ended comments concerning the particular web page, the second element appearing identically and behaving consistently each time it is displayed in response to user selection of the first element viewable on a particular web page;
    using software associated with the first element to receive the user selection of the first element and initiate display of the second element in response; and
    using software associated with the second element to receive the page-specific user feedback, the page-specific user feedback concerning the particular webpages having been provided by a user while the user remained at the particular web page, and comprising one or more page-specific subjective ratings of the particular web page and one or more associated page-specific open-ended comments concerning the particular web page for reporting to an interested party, the page-specific user feedback allowing the interested party to access page-specific subjective ratings and associated page-specific open-ended comments across the plurality of particular web pages to identify one or more particular web pages for which the page-specific user feedback is notable relative to page-specific user feedback for other particular web pages;
    wherein: the first element is viewable within a browser window upon initial display of the particular web page; and the method further comprises causing the first element to remain viewable within the browser window, at least at least prior to the user selection, regardless of user scrolling.

27. The method of claim 26, wherein the software associated with the first element is incorporated into software of each of the plurality of particular web pages.

28. The method of claim 26, further comprising:
using the software associated with the second element to call a directory containing a script; and
using the script to receive the page-specific user feedback.

29. The method of claim 26, wherein the software associated with the first element is incorporated into a web browser of the user.

30. The method of claim 26, wherein each page-specific subjective rating comprises one of:
a page-specific subjective rating of the particular web page as a whole; and
a specific page-specific subjective rating of at least one characteristic of the particular web page as a whole.

31. The method of claim 26, wherein the page-specific user feedback comprises a user response to an explicit question presented to the user.

32. The method of claim 26, further comprising using software associated with the second element to receive demographic information from a user, in response to the page-specific user feedback concerning the particular web page, for reporting to the interested party in association with the page-specific user feedback concerning the particular web page.

33. The method of claim 26, wherein the plurality of particular web pages comprises substantially all web pages of the website.

* * * * *